US009450750B2

(12) United States Patent
Fujinami

(10) Patent No.: US 9,450,750 B2
(45) Date of Patent: Sep. 20, 2016

(54) COMMUNICATION APPARATUS AND SECRET INFORMATION SHARING METHOD

(75) Inventor: Makoto Fujinami, Tokyo (JP)

(73) Assignee: NEC CORPORATION, Tokyo (JP)

(*) Notice: Subject to any disclaimer, the term of this patent is extended or adjusted under 35 U.S.C. 154(b) by 911 days.

(21) Appl. No.: 13/256,701

(22) PCT Filed: Apr. 13, 2010

(86) PCT No.: PCT/JP2010/002666
§ 371 (c)(1),
(2), (4) Date: Sep. 15, 2011

(87) PCT Pub. No.: WO2010/131415
PCT Pub. Date: Nov. 18, 2010

(65) Prior Publication Data
US 2012/0045059 A1 Feb. 23, 2012

(30) Foreign Application Priority Data
May 14, 2009 (JP) .................................. 2009-117319

(51) Int. Cl.
*H04W 12/04* (2009.01)
*H04L 9/08* (2006.01)
(Continued)

(52) U.S. Cl.
CPC .............. *H04L 9/0866* (2013.01); *H04M 1/67* (2013.01); *H04W 12/04* (2013.01); *H04L 2209/80* (2013.01); *H04M 1/72544* (2013.01); *H04M 2250/52* (2013.01)

(58) Field of Classification Search
CPC ......... H04L 9/08; H04L 8/66; H04L 9/0861; H04L 63/06; H04L 63/0428; H04L 63/10; H04L 2209/80; H04W 12/04; H04W 12/02
See application file for complete search history.

(56) References Cited

U.S. PATENT DOCUMENTS 7,427,983 B1* 9/2008 Hildebrandt et al. ........ 345/175
2002/0057352 A1* 5/2002 Yamagishi .................... 348/232
(Continued)

FOREIGN PATENT DOCUMENTS

JP 11-55242 A 2/1999
JP 2001-211378 A 8/2001
(Continued)

OTHER PUBLICATIONS

International Search Report for PCT/JP2010/002666 mailed May 25, 2010.
(Continued)

*Primary Examiner* — Saleh Najjar
*Assistant Examiner* — Devin Almeida
(74) *Attorney, Agent, or Firm* — Sughrue Mion, PLLC

(57) ABSTRACT

A communication apparatus includes display control means for displaying a secret information image containing secret information, and secret information image generation means for, upon receiving a notification signal indicating that a preparation for shooting is completed from another communication apparatus, instructing the display control means to display the secret information image. Note that the display control means displays a predetermined dummy image, and the notification signal is a notification signal indicating that a shooting preparation has been completed based on the dummy image. Further, when the secret information image generation means receives a notification signal indicating that secret information contained in a secret information image is obtained from another communication apparatus, the secret information image generation means instructs the display control means to stop displaying the secret information image.

46 Claims, 17 Drawing Sheets

(51) Int. Cl.
*H04M 1/67* (2006.01)
*H04M 1/725* (2006.01)

(56) References Cited

U.S. PATENT DOCUMENTS

| | | | |
|---|---|---|---|
| 2002/0118958 A1* | 8/2002 | Ishikawa et al. | 386/117 |
| 2002/0154242 A1* | 10/2002 | Robins et al. | 348/362 |
| 2006/0208088 A1* | 9/2006 | Sekiguchi | 235/472.02 |
| 2007/0241194 A1* | 10/2007 | Lin et al. | 235/462.01 |

FOREIGN PATENT DOCUMENTS

| | | |
|---|---|---|
| JP | 2003-47074 A | 2/2003 |
| JP | 2004-242164 A | 8/2004 |
| JP | 2005120579 A | 5/2005 |
| JP | 2005176209 A | 6/2005 |
| JP | 2005318281 A | 11/2005 |
| JP | 2006092507 A | 4/2006 |
| JP | 2006121497 A | 5/2006 |
| JP | 2006-139349 A | 6/2006 |
| JP | 2006-217466 A | 8/2006 |
| JP | 2006261938 A | 9/2006 |
| JP | 2006261939 A | 9/2006 |
| JP | 2007-32062 A | 2/2007 |
| JP | 2007036404 A | 2/2007 |
| JP | 2007041095 A | 2/2007 |
| JP | 2007156812 A | 6/2007 |
| JP | 2007159001 A | 6/2007 |
| JP | 2007166568 A | 6/2007 |
| JP | 2007188321 A | 7/2007 |
| JP | 2007258993 A | 10/2007 |
| JP | 2007274567 A | 10/2007 |
| JP | 2007324926 A | 12/2007 |
| JP | 2008-22081 A | 1/2008 |
| JP | 2008-104679 A | 5/2008 |
| JP | 2008109425 A | 5/2008 |
| JP | 2008-172407 A | 7/2008 |
| JP | 2008211507 A | 9/2008 |
| JP | 2008301471 A | 12/2008 |
| JP | 2008312001 A | 12/2008 |
| JP | 2009-212816 A | 9/2009 |

OTHER PUBLICATIONS

Japanese Office Action for JP Application No. 2011-513223 mailed on May 28, 2013 with English Translation.

* cited by examiner

COMMUNICATION APPARATUS AND SECRET INFORMATION SHARING METHOD

TECHNICAL FIELD

The present invention relates to a communication apparatus and a secret information sharing method, in particular a communication apparatus and a secret information sharing method capable of mutually and securely sharing possessed secret information between communication apparatuses.

BACKGROUND ART

In order to implement mutual communication between communication apparatuses, there is information that has to be shared between the communication apparatuses.

For example, in wireless-LANs typified by IEEE (Institute of Electrical and Electronic Engineers) 802.11 series standards, security measures are taken by means of encryption in an attempt to conceal communication contents. To implement encrypted wireless-LAN communication, it is necessary to mutually share a cryptographic key between the transmission/reception communication apparatuses.

In wireless-LANs, a WEP (Wired Equivalent Privacy) method is usually adopted as the encryption method. The WEP method is an encryption technique that allows only communication apparatuses having the same pre-shared key to communicate with each other. In the WEP method, a 64-bit or 128-bit cryptographic key is shared between a wireless-LAN terminal (STA: Station) and a wireless-LAN access point (AP: Access Point), and their communication contents are encrypted/decrypted by using that cryptographic key. When a wireless-LAN is constructed in an ordinary home, the user of the wireless-LAN equipment includes only the user himself/herself and his/her family. Therefore, it is easy to set the same cryptographic key in the STA and the AP in advance. Further, in the case of public wireless-LANs used in public places such as train stations, airports, hotels, and restaurants, a user sets a cryptographic key, which is notified in advance and is the same for each user, in the AP in order to implement encrypted communication.

Meanwhile, there is a technique to facilitate the setting of information to be shared between communication apparatuses. Patent literature 1 discloses a communication apparatus capable of facilitating various settings including a device setting and a network setting. A communication apparatus disclosed in Patent literature 1 reads a 2D (two-dimensional) barcode containing device profile information such as a device serial number, a product name, a model number, a manufacturer name, a MAC (Media Access Control) address, and a PIN (Personal Identification Number) code in the form of image information, and carries out various settings based on the obtained barcode information. This 2D barcode is output or displayed by an output/display unit of the terminal to be registered/configured, or is stuck on the terminal to be registered/configured as a sticker. This communication apparatus disclosed in Patent literature 1 operates in the following manner.

A registering/managing terminal (e.g., mobile terminal) reads and takes in 2D barcode information stuck on a terminal to be registered/managed (e.g., wireless-LAN access point) by using a camera unit as an image-reading unit (step 1). The mobile terminal establishes a temporary connection, which is a temporary connection used to exchange wireless security setting information with the wireless-LAN access point, by using a wireless-LAN interface based on device profile information specified by the obtained barcode information (step 2).

Next, a user authentication processing unit performs an authentication process for the terminal at the other end by using the obtained device profile information (step 3). Next, key-sharing processing units (cryptographic key generation units) of the mobile terminal and the wireless-LAN access point exchange a key therebetween by using, for example, Diffie-Hellman method or the like, and thereby generate an encryption key. As a result, the mobile terminal and the wireless-LAN access point share that encryption key (step 4). Next, a setting information generation unit of the mobile terminal or the wireless-LAN access point automatically generates a cryptographic key such as WEP and/or wireless security setting information such as SSID (Service Set Identifier) (step 5). Next, this wireless security setting information is encrypted with the encryption key generated in the step 4, and then transferred according to a registration protocol (step 6).

The wireless security information setting has been completed in the above-described temporary connection, and wireless communication starts in the form of regular connection by using the wireless security setting information transferred in the step 5 (step 7).

Further, Patent literature 2 discloses a technique to display a pseudo-subject image in an external display device as an object that is used to detect the focus of a camera, and thereby to detect the focus.

Wireless-LAN access points in the above-described related-art are fixedly installed in public places such as train stations, airports, hotels, and restaurants, and provide wireless-LAN services in those public places. However, as the usability of wireless-LANs is improved, new ways of using wireless-LANs that are different from the conventional usage become feasible.

For example, by adding a wireless-LAN access point function in a mobile terminal capable of performing mobile communication, it is possible to use a wireless-LAN at any given place. That is, a mobile terminal having a wireless-LAN access point function and another terminal capable of implementing a wireless-LAN interface connection can access a backbone network at any given place by using a mobile communication function of the mobile terminal having the wireless-LAN access point function. In this case, the mobile terminal having the wireless-LAN access point function functions as an AP while the another terminal capable of implementing a wireless-LAN interface connection with this AP functions as an STA.

In the form of usage like this, it is naturally assumed that the user of the AP and the user of the STA are probably not complete strangers but are some acquaintances such as friends, associates, and colleagues. For example, there might be such a situation that two persons who are friends of each other and happen to meet with each other access the Internet at a given place such as a park, a restaurant, and a train station by using a mobile terminal having a wireless-LAN access point function possessed by one of them as an AP and a terminal (STA) possessed by the other of them. Even for the encryption of communication performed in the form of usage of wireless-LANs like this situation, it is necessary to share a cryptographic key between the mobile terminal having a wireless-LAN access point function possessed by one of them and the terminal possessed by the other of them. In addition, since it is rare that the same cryptographic key has been shared in advance between their devices, it is necessary to carry out an operation for establishing shared setting on the spot.

Further, in the form of usage of mobile terminals like this, it is also necessary that the mobile terminal on the STA side notifies not only the cryptographic key but also other secret information such as user identification information and a password to the mobile terminal on the AP side in advance.

The communication apparatus disclosed in Patent literature 1 can carry out various settings including a device setting and a network setting by using a 2D barcode with ease. In this case, a 2D barcode is displayed in a display device of a terminal to be registered/configured, and a registering/managing terminal reads the display. By doing so, the various settings are carried out.

CITATION LIST

Patent Literature

Patent literature 1: Japanese Unexamined Patent Application Publication No. 2007-324926
Patent literature 2: Japanese Unexamined Patent Application Publication No. 2007-041095

SUMMARY OF INVENTION

Technical Problem

However, the above-described related art has not given any consideration to controlling the display timing of a secret information image to prevent strangers from stealing a glance at the secret information image.

An object of the present invention is to provide a communication apparatus and a secret information sharing method capable of controlling the display timing of a secret information image.

Solution to Problem

A communication apparatus according to the present invention includes: display control means for displaying a secret information image containing secret information; and secret information image generation means for, upon receiving a notification signal indicating that a preparation for shooting is completed from another communication apparatus, instructing the display control means to display the secret information image.

Further, a communication apparatus according to the present invention includes: display control means for displaying a secret information image containing secret information; and secret information image generation means for, upon receiving a notification signal indicating that the secret information of the secret information image is obtained from another communication apparatus, instructing the display control means to stop displaying the secret information image.

Further, a communication apparatus according to the present invention includes: shooting control means for setting a condition for subsequent shooting and outputting a notification signal notifying completion of a preparation for the shooting; and secret information image analysis means for extracting secret information from a secret information image obtained by shooting the secret information image containing the secret information displayed in another communication apparatus.

A secret information sharing method according to the present invention includes: setting a condition for subsequent shooting and transmitting a notification signal notifying completion of a preparation for the shooting to a first communication apparatus; upon receiving a notification signal indicating that the shooting preparation is completed from a second communication apparatus, displaying a secret information image containing secret information in the first communication apparatus; and extracting the secret information from the secret information image that is displayed in the first communication apparatus and shot by the second communication apparatus.

Further, a secret information sharing method according to the present invention includes: displaying a secret information image containing secret information in a first communication apparatus; and upon receiving a notification indicating that the secret information of the secret information image is obtained from a second communication apparatus, stopping displaying the secret information image.

Further, in a secret information sharing method according to the present invention, upon receiving a notification signal indicating that a preparation for shooting is completed from another communication apparatus, a secret information image containing secret information is displayed.

Further, a secret information sharing method according to the present invention includes: displaying a secret information image containing secret information; and upon receiving a notification indicating that the secret information of the secret information image is obtained from another communication apparatus, stopping displaying the secret information image.

Further, a secret information sharing method according to the present invention includes: setting a condition for subsequent shooting, and transmitting a notification signal notifying completion of a preparation for the shooting to another communication apparatus; and extracting secret information from a secret information image obtained by shooting the secret information image containing the secret information displayed in the another communication apparatus.

A program according to the present invention is a program that causes a computer to execute secret information sharing processing, in which the program causes the computer to execute, upon receiving a notification signal indicating that a preparation for shooting is completed from another communication apparatus, a process of displaying a secret information image containing secret information.

Further, a program according to the present invention is a program that causes a computer to execute secret information sharing processing, in which the program causes the computer to execute: a process of displaying a secret information image containing secret information; and a process of, upon receiving a notification indicating that the secret information of the secret information image is obtained from another communication apparatus, stopping displaying the secret information image.

Further, a program according to the present invention is a program that causes a computer to execute secret information sharing processing, in which the program causes the computer to execute: a process of setting a condition for subsequent shooting, and transmitting a notification signal notifying completion of a preparation for the shooting to another communication apparatus; and a process of extracting secret information from a secret information image obtained by shooting the secret information image containing the secret information displayed in another communication apparatus.

Advantageous Effects of Invention

The present invention makes it possible to control the display timing of a secret information image.

DESCRIPTION OF EMBODIMENTS

Next, exemplary embodiments according to the present invention are explained in detail with reference to the drawings.

Figure 1:
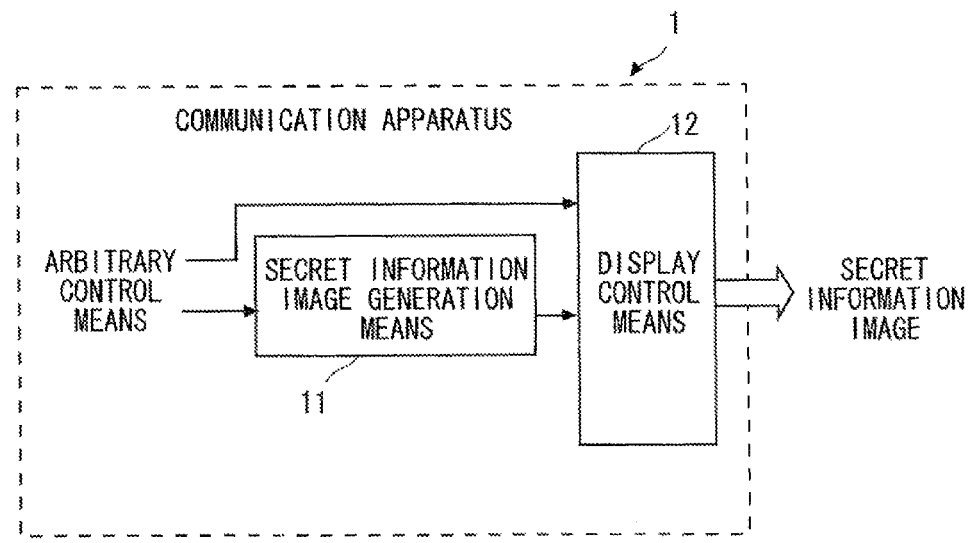
FIG. 1 is a block diagram showing a configuration of a communication apparatus according to a basic exemplary embodiment and a first exemplary embodiment of the present invention.

FIG. 1 is a block diagram showing a configuration of a communication apparatus 1 on the side from which secret information is transmitted according to a basic exemplary embodiment and a first exemplary embodiment of the present invention. Further, FIG. 2 is a block diagram showing a configuration of a communication apparatus 2 on the side at which the secret information is received according to the basic exemplary embodiment and the first exemplary embodiment of the present invention.

Figure 2:
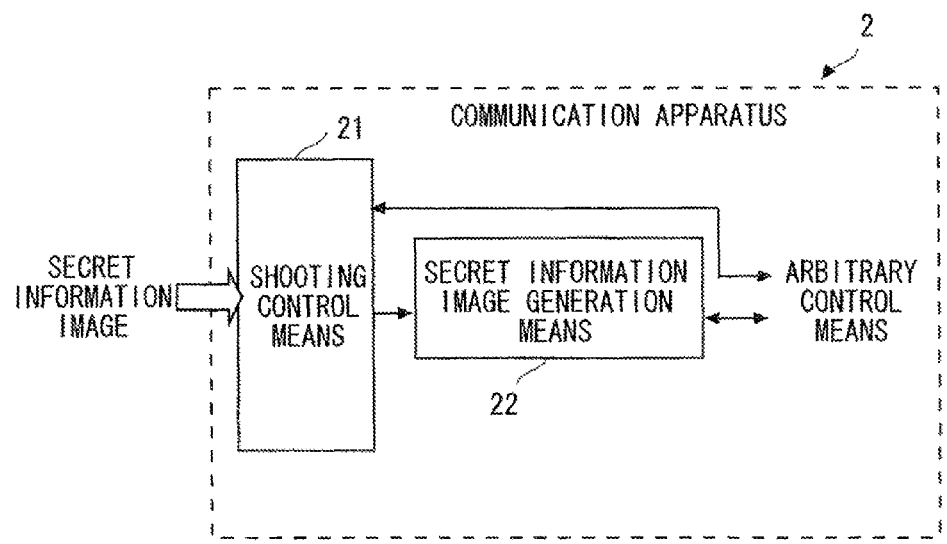
FIG. 2 is a block diagram showing a configuration of another communication apparatus according to a basic exemplary embodiment and a first exemplary embodiment of the present invention.

Note that in FIGS. 1 and 2, only the configurations relevant to the basic exemplary embodiment and the first exemplary embodiment are illustrated and illustration of other configurations necessary as a communication apparatus are omitted. Further, the communication apparatus according to this exemplary embodiment may implement control operations according to this exemplary embodiment by causing a CPU (Central Processing Unit) (not shown) to read a control program stored in a storage unit (not shown) according to various event information items and to execute the read control program.

The basic exemplary embodiment includes three basic forms shown below.

As shown in FIG. 1, a communication apparatus 1 according to a first basic form includes display control means 12 for displaying a secret information image containing secret information, and secret information image generation means 11 for instructing the display control means 12 to display a secret information image upon receiving a notification signal indicating that a preparation for shooting has been completed from other communication apparatuses.

When the secret information image generation means 11 receives a notification signal indicating that a preparation for shooting has been completed from other communication apparatuses, the secret information image generation means 11 operates so as to instruct the display control means 12 to display a secret information image. Then, the display control means 12 operates so as to display the secret information image containing secret information under that instruction.

With the configuration and operation like this, the communication apparatus 1 according to the first basic form can display a secret information image after receiving a notification signal indicating that a preparation for shooting has been completed from other communication apparatuses and thereby control the display timing of the secret information image.

As shown in FIG. 1, a communication apparatus 1 according to a second basic form includes display control means 12 for displaying a secret information image containing secret information, and secret information image generation means 11 for instructing the display control means 12 to stop displaying a secret information image upon receiving a notification signal indicating that secret information of a secret information image has been obtained from other communication apparatuses.

The display control means 12 displays a secret information image containing secret information. Then, when the secret information image generation means 11 receives a notification signal indicating that secret information of the secret information image has been obtained from other communication apparatuses, the secret information image generation means 11 operates so as to instruct the display control means 12 to stop displaying the secret information image.

With the configuration and operation like this, when the communication apparatus 1 according to the second basic form receives a notification signal indicating that secret information of a secret information image has been obtained from other communication apparatuses after displaying the secret information image containing the secret information in the display control means, the communication apparatus 1 stops displaying the secret information image. In this way, the communication apparatus 1 can control the display timing of a secret information image.

Further, a communication apparatus 2 according to a third basic form is a communication apparatus 2 that communicates with a communication apparatus according to the first or second basic format. As shown in FIG. 2, a communication apparatus 2 includes shooting control means 21 for setting a condition for subsequent shooting and for outputting a notification signal notifying the completion of the shooting preparation, and secret information image analysis means 22 for extracting secret information from a secret information image obtained by shooting the secret information image containing the secret information displayed in other communication apparatuses.

The shooting control means 21 operates so as to set a condition for subsequent shooting and to output a notification signal notifying the completion of the shooting preparation. Then, the secret information image analysis means 22 operates so as to extract secret information from a secret information image obtained by shooting the secret information image containing the secret information displayed in other communication apparatuses.

With the configuration and operation like this, the communication apparatus 2 according to the third basic form outputs a notification signal indicating that a shooting preparation has been complete. Therefore, the communication apparatus 2 can shoot a secret information image that is display by the communication apparatus 1 at the timing controlled by the communication apparatus 1, and extract secret information from that secret information image.

Therefore, in the basic exemplary embodiment, the following operation is also feasible.

The communication apparatus 2 sets a condition for subsequent shooting and transmits a notification signal notifying the completion of the shooting preparation to the communication apparatus 1. When the communication apparatus 1 receives the notification signal indicating that the shooting preparation has been completed from the communication apparatus 2, the communication apparatus 1 displays a secret information image containing secret information on the communication apparatus 1. Then, the communication apparatus 2 shoots the secret information image displayed in the communication apparatus 1 and extracts the secret information from the shot secret information image.

As explained above, in each of the basic exemplary embodiments, the communication apparatus 1 can control the display timing of a secret information image.

Next, the first exemplary embodiment according to the present invention is explained in detail with reference to FIGS. 1 to 4.

As shown in FIG. 1, a communication apparatus 1 on the side from which secret information is transmitted according to the first exemplary embodiment includes secret information image generation means 11 and display control means 12. The display control means 12 displays a secret information image containing secret information or a predetermined dummy image. Further, after displaying the predetermined dummy image, when the secret information image generation means 11 receives a notification signal indicating that a preparation for shooting has been completed based on the dummy image from other communication apparatuses, the secret information image generation means 11 instructs the display control means 12 to display the secret information image.

Further, as shown in FIG. 2, a communication apparatus 2 on the side at which the secret information is received according to the first exemplary embodiment includes shooting control means 21 and secret information image analysis means 22. The shooting control means 21 sets a condition for subsequent shooting based on a shooting result of a predetermined dummy image displayed in the other communication apparatus, and outputs a notification signal notifying the completion of the setting. Further, the secret information image analysis means 22 analyses a secret information image that is displayed in the other communication apparatus and obtained by shooting, and extracts secret information from that secret information image.

Note that in FIGS. 1 and 2 and other figures explained below, only the configurations relevant to this exemplary embodiment are illustrated and illustration of other configurations necessary as a communication apparatus are omitted. Further, the communication apparatus according to this exemplary embodiment may implement control operations according to this exemplary embodiment by causing a CPU (Central Processing Unit) (not shown) to read out a control program(s) stored in a storage unit (not shown) according to various event information items and to execute the read control program.

This exemplary embodiment is applied to communication apparatuses in the form of usage in which the communication apparatus 1 transmits secret information held by the communication apparatus 1 to the communication apparatus 2, and the secret information is thereby shared by both the communication apparatuses 1 and 2. Examples of the secret information include user identification information and a password of the communication apparatus 1. For example, this exemplary embodiment is applied to communication apparatuses in which user authentication needs to be carried out when the communication apparatus 1 connects to the communication apparatus 2. Further, this exemplary embodiment is applied to communication apparatuses in which the communication apparatus 2 carries out necessary user authentication on behalf of the communication apparatus 1 when the communication apparatus 1 accesses other networks (e.g., mobile network) through the communication apparatus 2.

The secret information image generation means 11 of the communication apparatus 1 generates a secret information image by converting secret information of the communication apparatus 1 into an image, and sends the generated secret information image to the display control means 12. The display control means 12 displays an arbitrary image irrelevant to the secret information as a dummy image. Further, when the secret information image generation means 11 receives a notification that a preparation for image-acquisition in the opposing communication apparatus 2 has been completed, the secret information image generation means 11 instructs the display control means 12 to display the secret information image instead of the dummy image.

Further, the shooting control means 21 of the communication apparatus 2 shoots the dummy image and the secret information image displayed in the communication apparatus 1. Further, the shooting control means 21 prepares for shooting performed by the shooting control means 21 based on the dummy image. For example, the shooting control means 21 adjusts the focus of a camera (not shown) provided in the shooting control means 21 based on the dummy image. When the shooting preparation has been completed, the shooting control means 21 transmits a shooting preparation completion notification signal to the communication apparatus 1. Note that the shooting control means 21 can automatically set the shooting condition such as the focus adjustment, which is set at this shooting preparation stage, in normal shooting operations performed after this shooting preparation.

The secret information image analysis means 22 analyses the secret information image that is shot and received by the shooting control means 21, and thereby extracts secret information contained in that image.

Note that "arbitrary control means" shown in FIGS. 1 and 2 means an application(s) that performs an arbitrary necessary control operation(s) in each communication apparatus.

Operations of the communication apparatus 1 and 2 having the above-described configurations are explained with reference to flowcharts shown in FIGS. 3 and 4 respectively.

Figure 3:
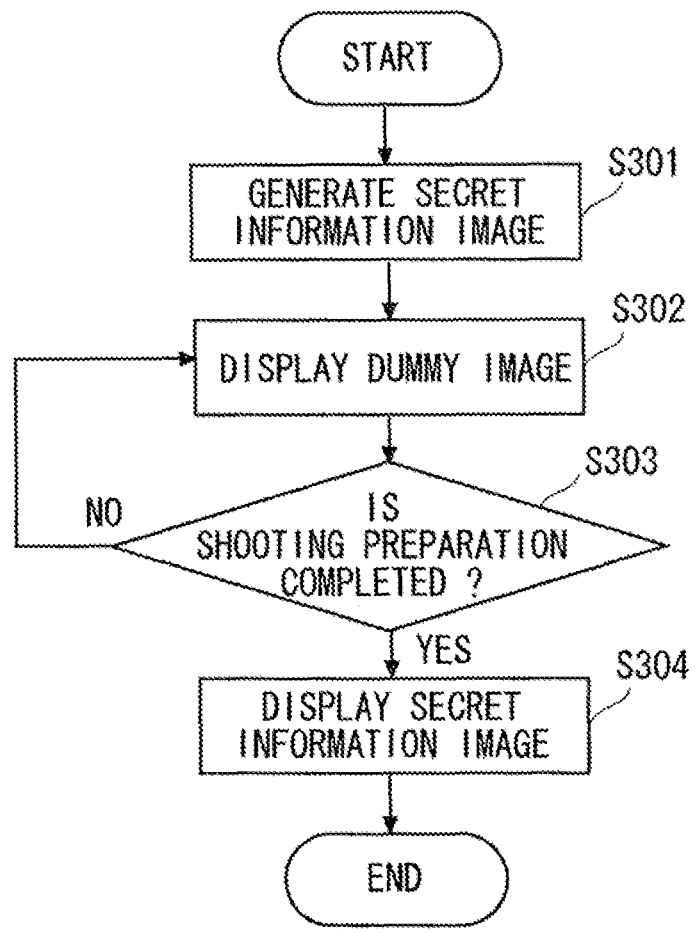
FIG. 3 is a flowchart showing an operation of a communication apparatus according to a first exemplary embodiment of the present invention.

FIG. 3 is a flowchart showing an operation of the communication apparatus 1 according to the first exemplary embodiment. When the transmission of secret information from the communication apparatus 1 to the communication apparatus 2 becomes necessary, the communication apparatus 1 starts the operation according to this exemplary embodiment. Examples of such occasions include a case in which when the communication apparatus 1 is trying to access the communication apparatus 2, the communication apparatus 2 requests user identification information and a password from the communication apparatus 1.

The communication apparatus 1 converts the secret information to be transmitted to the communication apparatus 2 into an image and thereby generates a secret information image by using the secret information image generation means 11 (step S301). Further, the display control means 13 displays a predetermined dummy image (step S302). Note that the communication apparatus 1 may display the dummy image first in the step S301, and then generate the secret information image in the step S302.

The opposing communication apparatus 2 prepares shooting based on the displayed dummy image, and when the preparation has been completed, transmits a shooting preparation completion notification. Therefore, the communication apparatus 1 waits for the reception of the shooting preparation completion notification (step S303).

When the communication apparatus 1 receives the shooting preparation completion notification from the communication apparatus 2 (Yes at step S303), the secret information image generation means 11 instructs the display control means 12 to display the secret information image instead of the dummy image. The display control means 12 displays the secret information image under that instruction (step S304).

Figure 4:
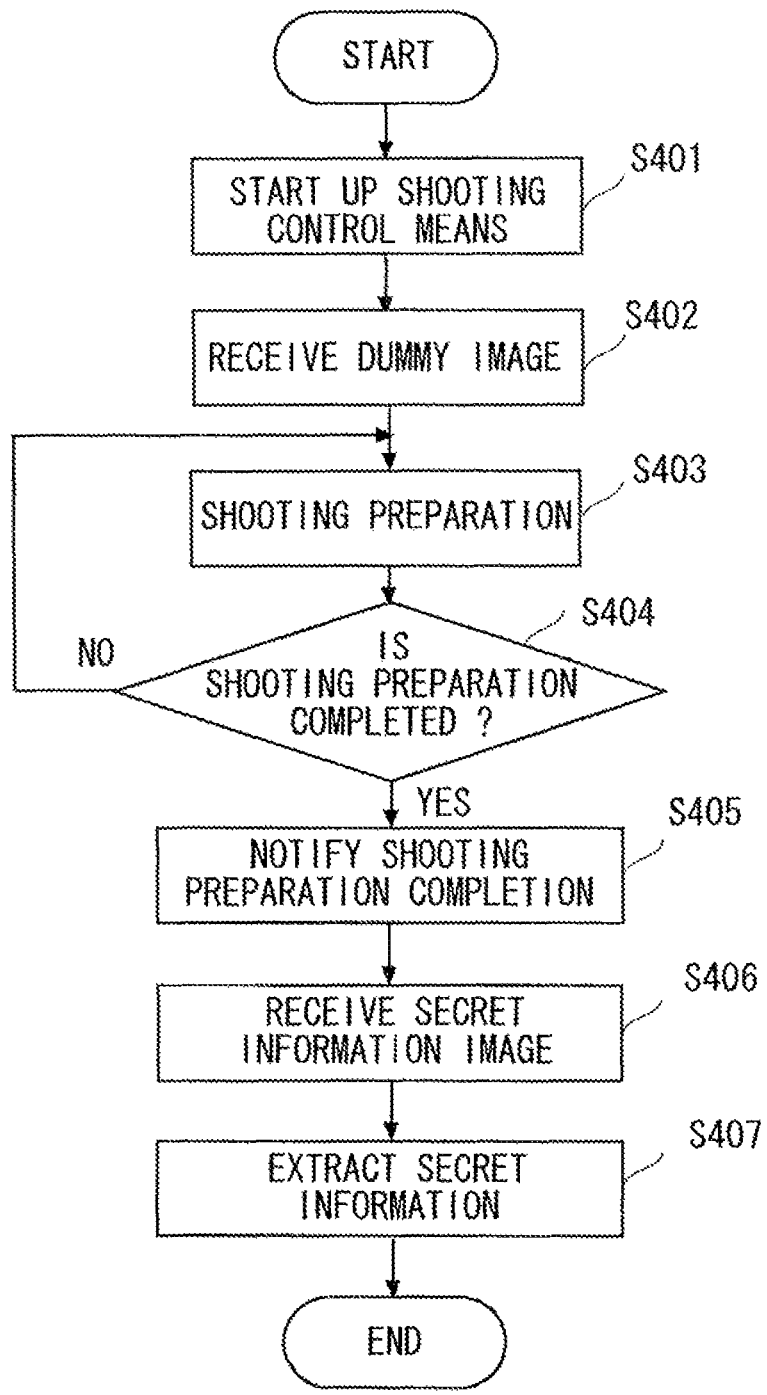
FIG. 4 is a flowchart showing an operation of another communication apparatus according to a first exemplary embodiment of the present invention.

FIG. 4 is a flowchart showing an operation of the communication apparatus 2 according to the first exemplary embodiment. When the necessity to obtain secret information of the communication apparatus 1 from the communication apparatus 1 arises, the communication apparatus 2 starts the operation according to this exemplary embodiment. Examples of such occasions include a case in which when the communication apparatus 1 is trying to access the communication apparatus 2, the communication apparatus 2 requests user identification information and a password from the communication apparatus 1.

Firstly, the communication apparatus 2 starts up the shooting control means 21 (step S401). A user of the communication apparatus 2 shoots a dummy image displayed in the communication apparatus 1 by using the shooting control means 21 (step S402). The shooting control means 21 prepares shooting (e.g., focus adjustment of the camera) based on the dummy image that is shot and received by the shooting control means 21 (steps S403 and S404). When the shooting preparation has been completed (Yes at step S404), the shooting control means 21 transmits a shooting preparation completion notification to the communication apparatus 1 (step S405).

The user of the communication apparatus 2 shoots a secret information image displayed in the communication apparatus 1, which has received the shooting preparation completion notification, by using the shooting control means 21 (step S406). The shot secret information image is sent to the secret information image analysis means 22. The secret information image analysis means 22 extracts and obtains secret information from the sent secret information image (step S407).

As explained above, the communication apparatus 1 according to the first exemplary embodiment displays the dummy image before displaying the secret information image. Then, the communication apparatus 1 according to this exemplary embodiment displays the secret information image after the communication apparatus 1 receives the shooting preparation completion notification from the communication apparatus 2 that is supposed to receive the secret information. Therefore, the communication apparatus 1 according to this exemplary embodiment can shorten the display time of the secret information image to be transmitted to the communication apparatus 2. Further, the communication apparatus 2 according to this exemplary embodiment prepares shooting by using the dummy image that is displayed by the communication apparatus 1 in the operation for obtaining the secret information of the communication apparatus 1. Then, when the shooting preparation has been completed, the communication apparatus 2 notifies the communication apparatus 1 of the completion of the shooting preparation. Then, after that the communication apparatus 2 shoots the secret information image. As a result, the communication apparatus 2 according to this exemplary embodiment can shoot the secret information image to be received from the communication apparatus 1 in a short time, and thereby preventing a third person from reading the secret information image as much as possible.

Note that as a modified example of the first exemplary embodiment, the display control means 12 of the communication apparatus 1 may have such a function that the secret information image is displayed only for a predetermined time period. In this case, the display control means of the communication apparatus 1 displays the secret information image and measures the display time in the step S304 in FIG.

3. Then, when a predetermined time period has elapsed, the display control means may stop displaying the secret information image.

Next, a communication apparatus according to a second exemplary embodiment of the present invention is explained.

Figure 5:
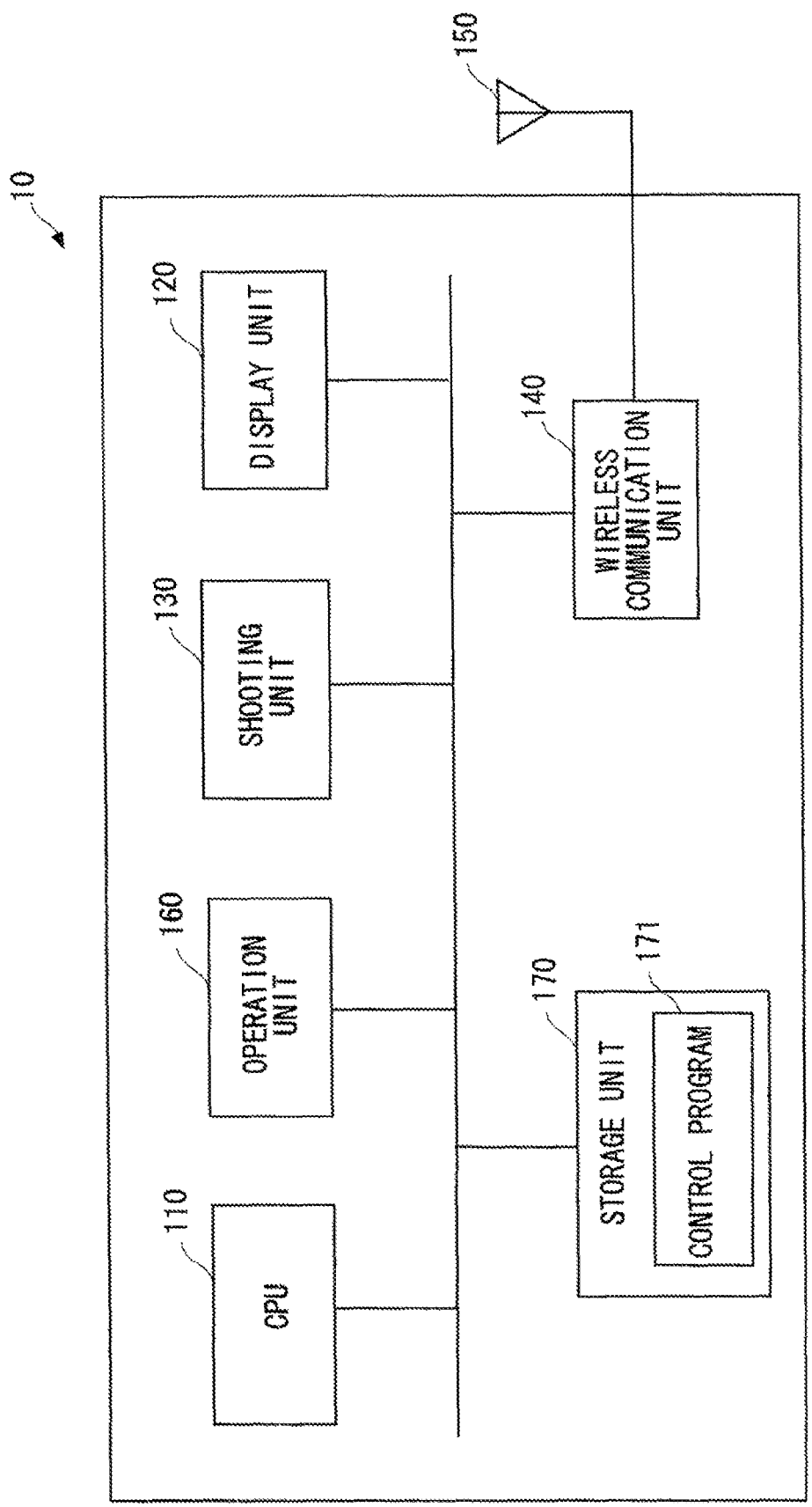
FIG. 5 is a block diagram showing a general configuration of a communication apparatus according to a second exemplary embodiment of the present invention.

FIG. 5 is a block diagram showing a general configuration of a communication apparatus according to a second exemplary embodiment of the present invention. In the second exemplary embodiment, as an example, communication apparatuses having identical and symmetrical configurations are shown as the two communication apparatuses that perform reciprocal communication.

Further, in the second exemplary embodiment, the communication apparatus is configured to control the display time of the secret information image. That is, in order to shorten the display time of the secret information image, the communication apparatus stops displaying the secret information image when the communication apparatus confirms that the other communication apparatus has obtained the secret information.

As shown in FIG. 5, a communication apparatus 10 includes, as principal components, a CPU (Central Processing Unit) 110, a display unit 120, a shooting unit 130, a wireless communication unit 140, an antenna 150, an operation unit 160, and a storage unit 170. The CPU 110 controls the overall operation of the communication apparatus 10. The display unit 120 displays transmission information to a communication apparatus at the other end, notification information to a user, and/or the like. The shooting unit 130 takes in transmission information displayed on the display unit 120 of the communication apparatus at the other end in the form of image information. The wireless communication unit 140 and the antenna 150 perform wireless communication with the communication apparatus at the other end. The operation unit 160 receives operation information entered by a user. The storage unit 170 stores a control program 171 relevant to this exemplary embodiment. The CPU 110 implements control operations according to the present invention by reading and executing the control program 171 according to various event information items. Note that although the wireless communication performed by the wireless communication unit 140 is explained by using a wireless-LAN as an example, the wireless communication does not necessarily have to be performed by using the wireless-LAN. That is, the wireless communication may be other short-distance wireless communication using other wireless communication standards such as Bluetooth (registered trademark) and ZigBee (registered trademark).

This exemplary embodiment is communication apparatuses in which a cryptographic key used for the encryption of wireless communication is transmitted from one of the communication apparatuses to the other communication apparatus as secret information and the cryptographic key is thereby shared by these two communication apparatuses. Further, when a cryptographic key is transmitted, one of the communication apparatuses displays a secret information image containing the cryptographic key on its display unit 120 and the other communication apparatus shoots the secret information image by using its shooting unit 130. In this exemplary embodiment, a 2D (two-dimensional) barcode image is used as an example secret information image. However, the secret information image is not limited to 2D barcodes, and may be any form of images containing secret information.

Figure 6:
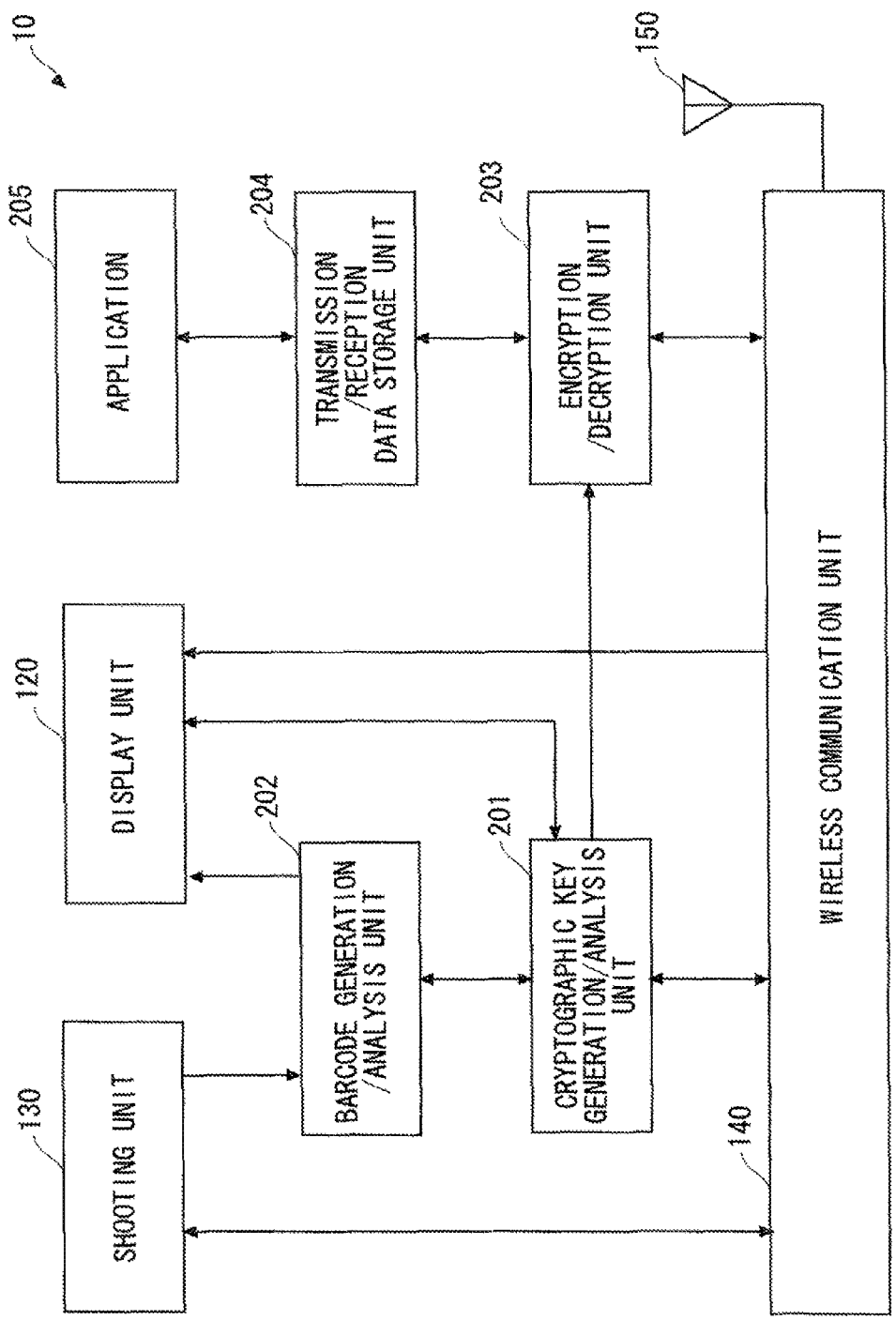
FIG. 6 is a block diagram showing a configuration of a communication apparatus according to a second exemplary embodiment of the present invention.

FIG. 6 is a block diagram showing a functional configuration of a communication apparatus according to the second exemplary embodiment of the present invention. FIG. 6 is a block diagram showing a functional configuration of the communication apparatus 10 with its internal data flows, and is shown in the form of functional blocks including functions implemented by the control program 171 shown in FIG. 5.

Figure 7:
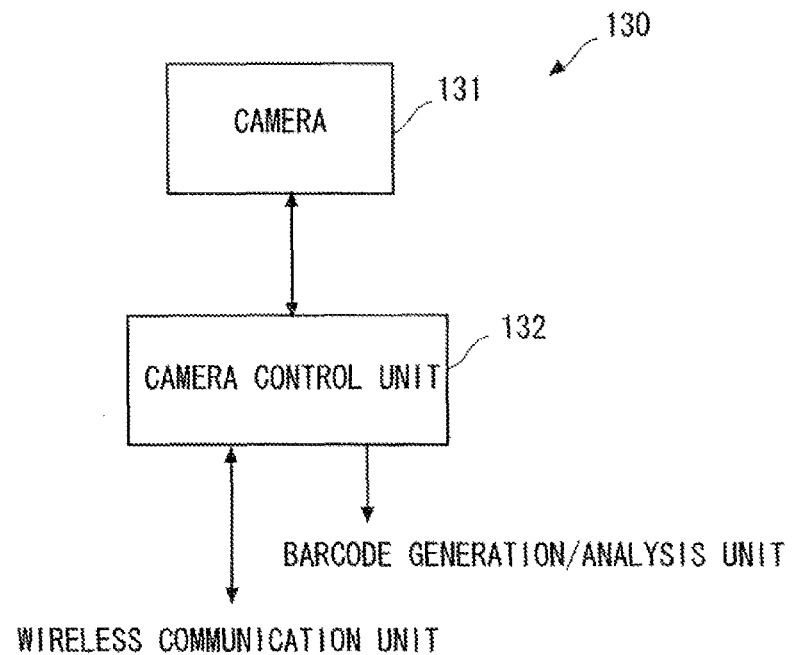
FIG. 7 is a block diagram showing a configuration of a shooting unit shown in FIG. 6.
Figure 8:
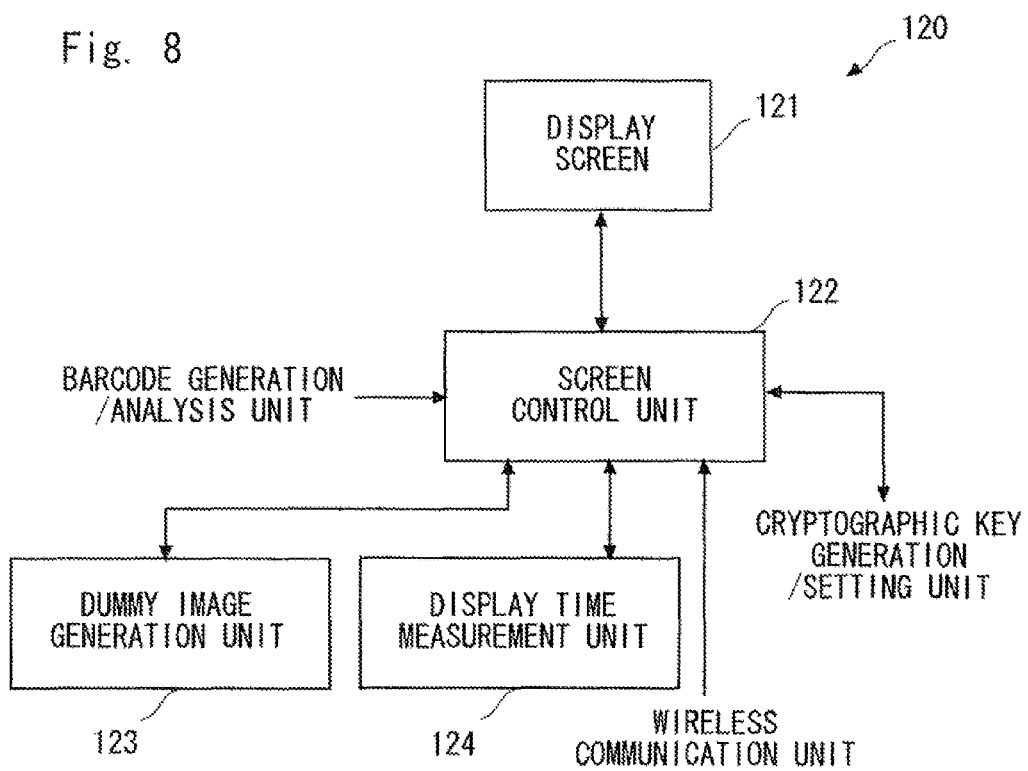
FIG. 8 is a block diagram showing a configuration of a display unit shown in FIG. 6.

As shown in FIG. 6, the communication apparatus 10 includes, in addition to the configuration shown in FIG. 5, a cryptographic key generation/setting unit 201, a barcode generation/analysis unit 202, an encryption/decryption unit 203, a transmission/reception data storage unit 204, and an application 205. Further, as shown in FIG. 7, the shooting unit 130 includes a camera 131 and a camera control unit 132. Further, as shown in FIG. 8, the display unit 120 includes a display screen 121, a screen control unit 122, a dummy image generation unit 123 that generates a dummy image (which is described later), and a display time measurement unit 124.

In the communication apparatus 10 on the cryptographic key transmission side, the cryptographic key generation/setting unit 201 generates cryptographic key information and sends the generated cryptographic key information to the barcode generation/analysis unit 202. Meanwhile, in the communication apparatus 10 on the cryptographic key reception side, the cryptographic key generation/setting unit 201 sets a cryptographic key received from the barcode generation/analysis unit 202 in the encryption/decryption unit 203.

In the communication apparatus 10 on the cryptographic key transmission side, the barcode generation/analysis unit 202 converts the cryptographic key information sent from the cryptographic key generation/setting unit 201 into a 2D barcode image and sends the resultant 2D barcode image to the display unit 120. Meanwhile, in the communication apparatus 10 on the cryptographic key reception side, the barcode generation/analysis unit 202 analyzes a 2D barcode image that is shot and received by the shooting unit 130, and thereby extracts an cryptographic key encoded into the barcode image. Then, the barcode generation/analysis unit 202 sends the extracted cryptographic key to the cryptographic key generation/setting unit 201.

The camera control unit 132 detects whether an image received by the camera 131 is in focus or not, and thereby sets a shooting condition such as a focus adjustment of the camera 131. The above-described dummy image is used for the setting of a shooting condition such as a focus adjustment of the camera 131, and is a dummy display image that does not need to be protected from a third person who is not involved in the communication. Note that the camera control unit 132 can automatically set the shooting condition, which is set by using the dummy image, in normal shooting operations performed after this shooting condition setting.

The screen control unit 122 receives the dummy image and the 2D barcode image, also receives information from the barcode generation/analysis unit 202 and the wireless communication unit 140, and thereby controls information to be displayed on the display screen 121 and its displaying method. The display time measurement unit 124 measures an elapsed time from when the display of the 2D barcode on the display screen 121 is started to when the display is stopped, and determines whether the measured elapsed time is within a specified time period or not. The display screen 121, which is composed of a liquid crystal display device, an organic EL (Electro Luminescence), or the like, displays display data such as an image and letters received from the screen control unit 122 on the screen.

The application 205 is an arbitrary application that performs encrypted communication with the communication apparatus 10 at the other end. The data that is transmitted/received by the application 205 is stored in the transmission/reception data storage unit 204. The transmission data to be transmitted by the application 205 is temporarily stored in the transmission/reception data storage unit 204. After that, the data is read out from the transmission/reception data storage unit 204, encrypted by the encryption/decryption unit 203, and transmitted to the communication apparatus 10 at the other end through the wireless communication unit 140. Further, encrypted reception data received from the communication apparatus 10 at the other end through the wireless communication unit 140 is decrypted by the encryption/decryption unit 203, stored into the transmission/reception data storage unit 204, and read out by the application 205.

Note that, in relation to the cryptographic key sharing control performed by the communication apparatus according to this exemplary embodiment, the wireless communication unit 140 includes a communication control unit (not shown) that transmits/receives notification information (notification packet) reciprocally transmitted/received between the opposing communication apparatus. This communication control unit performs control in cooperation with each of the above-described control units according to the notification packet to be transmitted/received.

Next, internal data flows and operations relating to the cryptographic key sharing in the communication apparatus 10 having the above-described configuration are explained with reference to a sequence diagram shown in FIG. 9.

Figure 9:
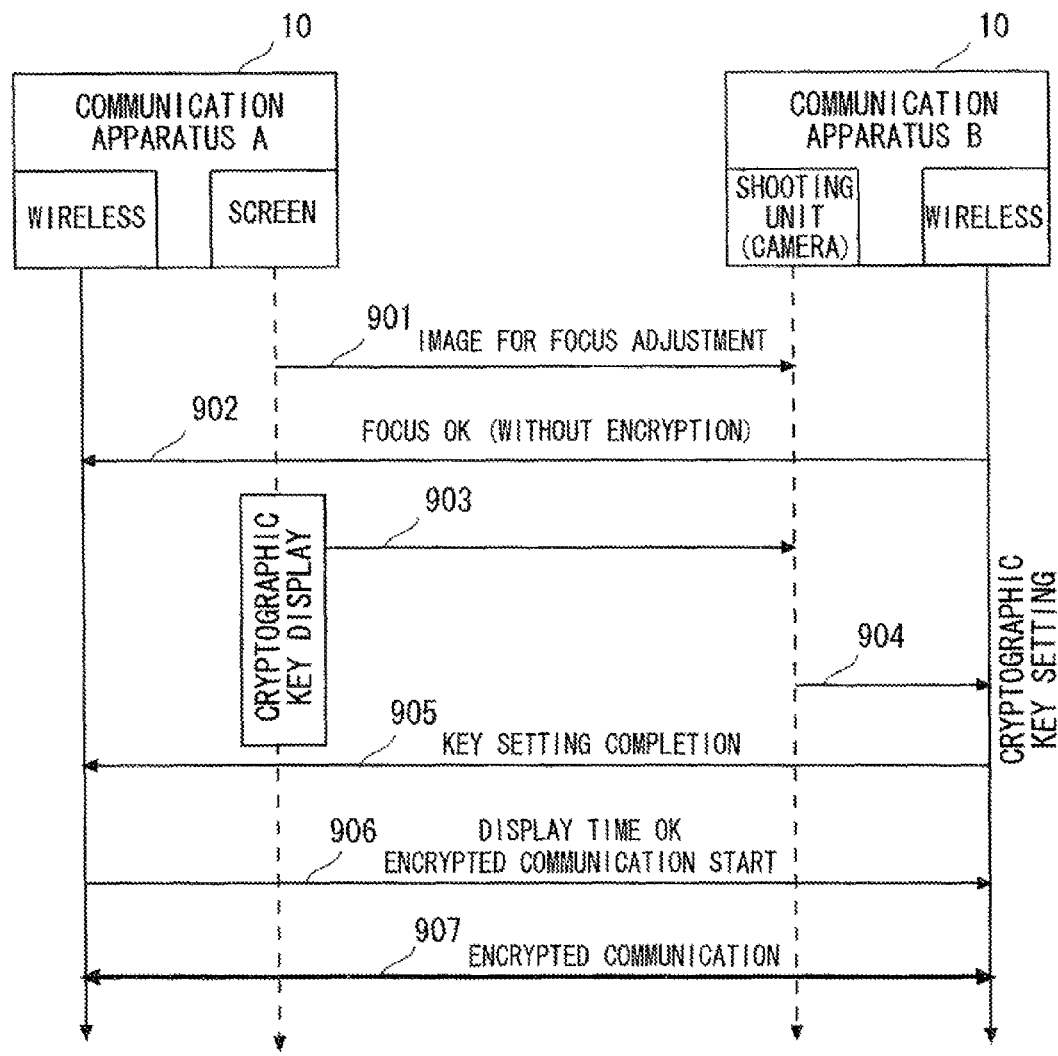
FIG. 9 is a sequence diagram showing a cryptographic key sharing operation performed between communication apparatuses according to a second exemplary embodiment of the present invention.

FIG. 9 shows an operation sequence in which a communication apparatus A generates a cryptographic key and a communication apparatus B receives and shares the cryptographic key.

Firstly, the communication apparatus A and the communication apparatus B function as an STA and an AP, respectively, in a wireless LAN. When users of the communication apparatuses A and B bring their apparatuses closer to each other and the communication apparatuses A and B are thereby brought in the reciprocal radio-wave receivable range, management frames are transmitted/received between both communication apparatuses to establish association and the association is thereby established. For example, the AP transmits a beacon containing an SSID at regular intervals, and the STA has a function of receiving this SSID. Further, it is premised on the open authentication.

In the communication apparatus A, when association is established, information indicating the association establishment is notified from the wireless communication unit 140 to the screen control unit 122 of the display unit 120 and to the cryptographic key generation/setting unit 201.

The screen control unit 122 displays a dummy image for a focus adjustment generated by the dummy image generation unit 123 on the display screen 121 based on the notification from the wireless communication unit 140 (step 901).

Further, the cryptographic key generation/setting unit 201 generates a cryptographic key for use in encrypted communication based on the notification from the wireless communication unit 140, and sends the generated cryptographic key to the barcode generation/analysis unit 202. The barcode generation/analysis unit 202 generates a 2D barcode image from the received cryptographic key information and sends the generated 2D barcode image to the screen control unit 122.

Meanwhile, in the opposing communication apparatus B, when the association is established, the wireless communication unit 140 instructs the camera control unit 132 of the shooting unit 130 to start up the camera module. After recognizing that the camera 131 has been started up, a user of the communication apparatus B shoots the dummy image displayed on the display screen 121 of the communication apparatus A by using the camera 131. The camera control unit 132 performs shooting setting such as a focus adjustment of the camera 131 based on this dummy image, which has been shot and received. When this shooting setting such as the focus adjustment has been completed, the camera control unit 132 outputs a signal notifying the completion of the shooting setting including the focus adjustment to the wireless communication unit 140. The communication apparatus B transmits a packet indicating the completion of the shooting setting (including the focus adjustment) (focus-OK) to the communication apparatus A (step 902).

When the wireless communication unit 140 of the communication apparatus A receives the focus-OK packet indicating the completion of the shooting setting, the wireless communication unit 140 sends an instruction to switch the display of the display screen 121 to the screen control unit 122. Upon receiving the display switching instruction, the screen control unit 122 switches the image displayed on the display screen 121 from the dummy image to the 2D barcode image sent from the barcode generation/analysis unit 202.

As described above, the communication apparatus according to this exemplary embodiment displays the dummy image on the display screen 121 as the preliminary step before displaying the 2D barcode image containing the cryptographic key on the display screen 121. That is, when the operations that need to be performed prior to the image-receiving process such as a focus adjustment are being performed, the dummy image that does not need to be protected from a third person is displayed instead of displaying the 2D barcode image containing the cryptographic key. In this way, the time period during which the 2D barcode image containing the cryptographic key is displayed is shortened. Therefore, the communication apparatus A, which transmits the cryptographic key, displays the actual 2D barcode image containing the cryptographic key only after the communication apparatus A recognizes that the focus adjustment has been completed in the communication apparatus B, which receives the cryptographic key.

Next, when the user of the communication apparatus B recognizes that the display on the display screen 121 of the communication apparatus A is switched from the dummy image to the 2D barcode image, the user shoots the 2D barcode image displayed on the display screen 121 of the communication apparatus A with camera 131 by operating the operation unit 16 (step 903). This shot 2D barcode image is sent to the barcode generation/analysis unit 202.

The barcode generation/analysis unit 202, to which the 2D barcode image is sent, analyzes the 2D barcode image and thereby extracts information contained in the barcode. When the extracted information is a cryptographic key, the barcode generation/analysis unit 202 sends the extracted cryptographic key to the cryptographic key generation/setting unit 201. The cryptographic key generation/setting unit 201 sets the cryptographic key in the encryption/decryption unit 203 (step 904).

In the communication apparatus B, which has received the cryptographic key, when the setting in the encryption/decryption unit 203 has been completed, the cryptographic key generation/setting unit 201 outputs a signal notifying the completion of the cryptographic key setting to the wireless communication unit 140. The communication apparatus B transmits a packet indicating the completion of the cryptographic key setting (cryptographic key setting completion report) to the communication apparatus A (step 905).

In the communication apparatus A, which has received this cryptographic key setting completion report packet, the wireless communication unit 140 instructs the screen control unit 122 to stop displaying the 2D barcode image containing the cryptographic key on the display screen 121 and the display on the display screen 121 is thereby switched from the 2D barcode image to other images. In this process, the above-described dummy image may be displayed. Alternatively, a message to the effect that the normality of the display time is being checked (which is described later) may be displayed.

Further, in the communication apparatus A, which has received this cryptographic key setting completion report packet, the wireless communication unit 140 outputs a signal notifying that the cryptographic key setting has been completed in the communication apparatus B to the cryptographic key generation/setting, unit 201. Upon recognizing that the cryptographic key setting has been completed in the communication apparatus B, the cryptographic key generation/setting unit 201 determines whether the display time of the barcode on the display screen 121 was within a specified time period or not. This process is performed in order to determine whether the purpose of displaying the 2D barcode image containing the cryptographic key only for a short time has been achieved or not. To that end, the communication apparatus according to the present invention performs a display time normality checking operation explained below.

Therefore, the cryptographic key generation/setting unit 201 sends an inquiry to the screen control unit 122 about whether the display time of the 2D barcode image on the display screen 121 was within a specified time period or not. The screen control unit 122 instructs the display time measurement unit 124 to report the measured time period between the display start of the 2D barcode image on the display screen 121 and the display stop.

As described previously, the display time measurement unit 124 measures the elapsed time from when the display of the 2D barcode image on the display screen 121 is started to when the display is stopped. The display time measurement unit 124 carried out this process by monitoring a control signal transmitted from the screen control unit 122 to the display screen 121. Upon receiving the report instruction from the screen control unit 122, the display time measurement unit 124 determines whether the measured display time was within the specified time period or not and reports the determination result to the screen control unit 122. An example of this specified time period is about 5 seconds in consideration that the 2D barcode image has to be able to be read with an ordinary operation and the 2D barcode image should not be displayed for an unnecessarily long time.

Upon receiving the report from the display time measurement unit 124, the screen control unit 122 notifies the information whether the display time was within the specified time period or not to the cryptographic key generation/setting unit 201.

Firstly, an operation that is performed when the display time of the 2D barcode image, which is displayed in the communication apparatus A to transmit the cryptographic key, is within the specified time period is explained.

When the cryptographic key generation/setting unit 201 of the communication apparatus A recognizes that the display time of the 2D barcode image was within the specified time period by the notification from the screen control unit 122, the cryptographic key generation/setting unit 201 sets the generated cryptographic key in the encryption/decryption unit 203 of the communication apparatus A itself. Then, the cryptographic key generation/setting unit 201 notifies the wireless communication unit 140 that the setting of the cryptographic key in the communication apparatus A itself has been completed. Upon receiving the report of the cryptographic key setting completion in the communication apparatus A itself from the cryptographic key generation/setting unit 201, the wireless communication unit 140 sends an encrypted-communication start packet indicating that communication is to be encrypted to the opposing communication apparatus B (step 906). After this encrypted-communication start packet, both of the communication apparatuses A and B perform encrypted communication by using the cryptographic key, which has been set in the above-described manner (step 907).

Figure 10:
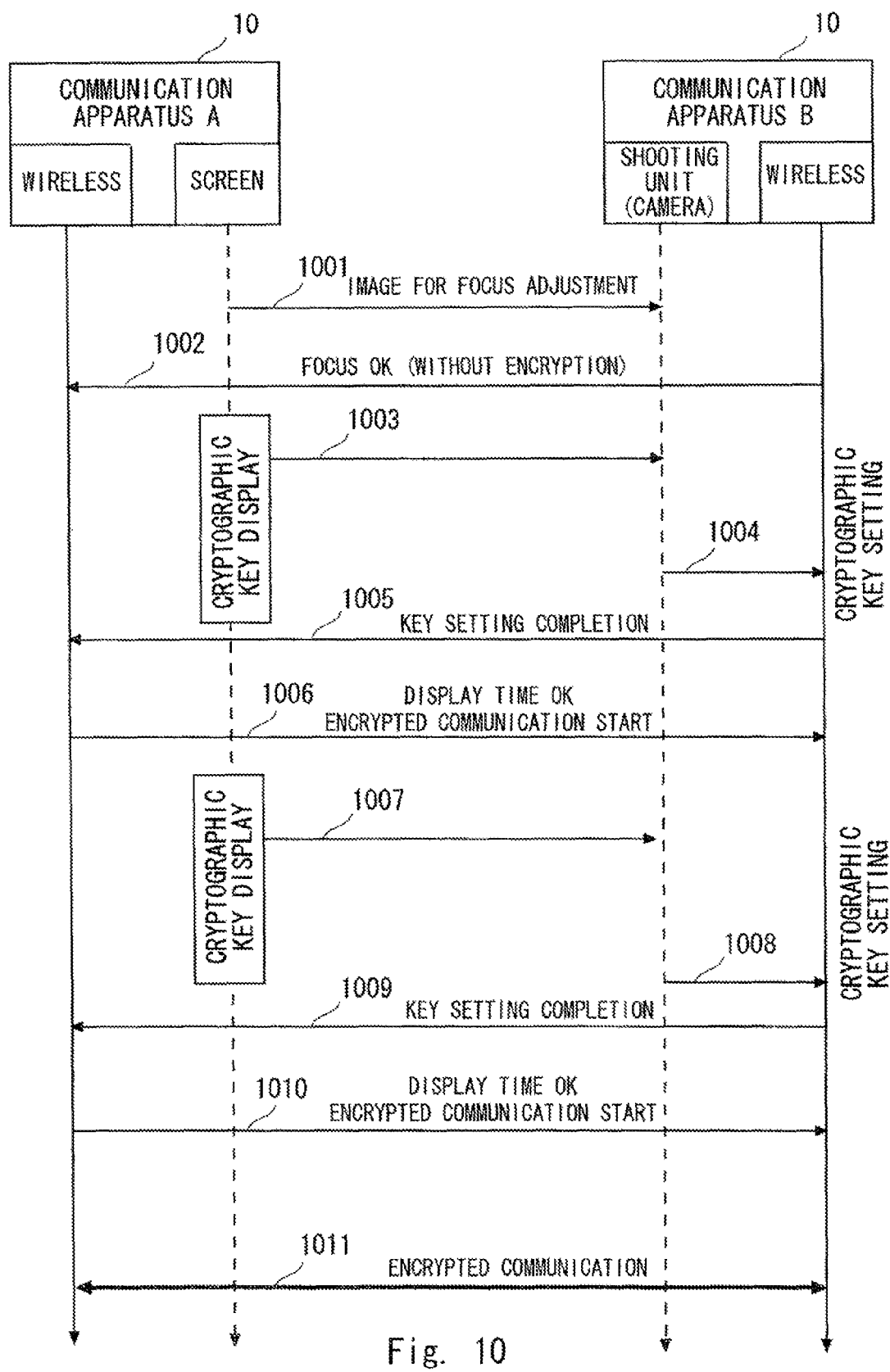
FIG. 10 is a sequence diagram showing an operation in which the sharing of a cryptographic key has failed in a first attempt and a barcode is displayed in a screen again, among sequences of cryptographic key sharing operations performed between communication apparatuses according to a second exemplary embodiment of the present invention.

Next, an operation that is performed when the 2D barcode image has been displayed for a duration longer than the specified time period in the communication apparatus A is explained with reference to FIG. 10. FIG. 10 is a sequence diagram showing an operation in which the sharing of the cryptographic key has failed in a first attempt and the 2D barcode image is displayed on the screen again, among sequences of cryptographic key sharing operations performed between the communication apparatuses A and B.

The sequence at and before the cryptographic key setting in the step 1004 in FIG. 10 and the step 1005 in which the cryptographic key setting completion report packet is transmitted from the communication apparatus B to the communication apparatus A are similar to those at and before the steps 904 and 905 in FIG. 9.

An operation that is performed when the display time from the display start of a 2D barcode image to the display stop in the communication apparatus A, which has received the cryptographic key setting completion report packet, is determined to be longer than the specified time period is explained hereinafter.

When the display time of a 2D barcode image exceeds the specified time period, the safety of the cryptographic key contained in the 2D barcode image cannot be sufficiently ensured.

In this case, the communication apparatus A, which transmits the cryptographic key, sends a packet notifying that a 2D barcode image containing a new different cryptographic key is displayed again (barcode re-display notification) to the communication apparatus B (step 1006). That is, when the display time of a 2D barcode image exceeds the specified time period, the screen control unit 122 of the communication apparatus A sends a notification to that effect to the cryptographic key generation/setting unit 201 Then, upon receiving the cryptographic key re-setting report from the cryptographic key generation/setting unit 201, the wireless communication unit 140 sends a packet indicating that a 2D barcode image containing a new different cryptographic key is displayed again to the opposing communication apparatus B in a step 1006.

In the communication apparatus B, which has received this barcode re-display notification packet, the cryptographic key generation/setting unit 201 performs a process of invalidating the cryptographic key, which was set in the encryption/decryption unit 203 in a previous step. That is, the cryptographic key, which was set in the encryption/decryption unit 203 in a previous step, is deleted. Further, in relation to this cryptographic key invalidating (deleting) process, a cryptographic key is set again on the display screen 121 through the screen control unit 122. Therefore, a message to the effect that a 2D barcode image is displayed again is displayed in order to notify the user of the communication apparatus B about that.

In the communication apparatus A, the cryptographic key generation/setting unit 201 generates a new cryptographic key and sends the generated new cryptographic key to the barcode generation/analysis unit 202. The barcode generation/analysis unit 202 generates a new 2D barcode image based on the received new cryptographic key and sends the generated new 2D barcode image to the screen control unit 122. The screen control unit 122 displays the received new 2D barcode image on the display screen 121.

Operations at and after the step 1007 are similar to those at and after the step 903 in FIG. 9. That is, when the barcode is displayed, again, the shooting setting including the focus adjustment has been already completed. Therefore, the 2D barcode image, which is displayed on the display screen 121 of the communication apparatus A and is shot and received by the camera 131 of the communication apparatus B, is sent to the barcode generation/analysis unit 202.

The new cryptographic key, which is extracted by the barcode generation/analysis unit 202 based on the new 2D barcode image, is set in the encryption/decryption unit 203 thorough the cryptographic key generation/setting unit 201 in the communication apparatus B. Then, upon receiving the cryptographic key setting completion notification from the cryptographic key generation/setting unit 201, the wireless communication unit 140 transmits a cryptographic key setting completion report packet to the communication apparatus A.

The communication apparatus A determines the pass/fail of the display time of the new 2D barcode image by using the cryptographic key setting completion report packet received from the communication apparatus B as a trigger.

If the display time of the 2D barcode image exceeds the specified time period again, the above-described sequence in the step 1006 is repeated. If the display time of the barcode is within the specified time period, the communication apparatus A sends an encrypted-communication start packet and thereby starts encrypted communication with the communication apparatus B by using the newly set cryptographic key in a similar manner to the sequence at and after the step 906 in FIG. 9.

Next, operations of the communication apparatuses A and B according to this exemplary embodiment are explained with reference to flowcharts shown in FIGS. 11 and 12 respectively.

Figure 11:
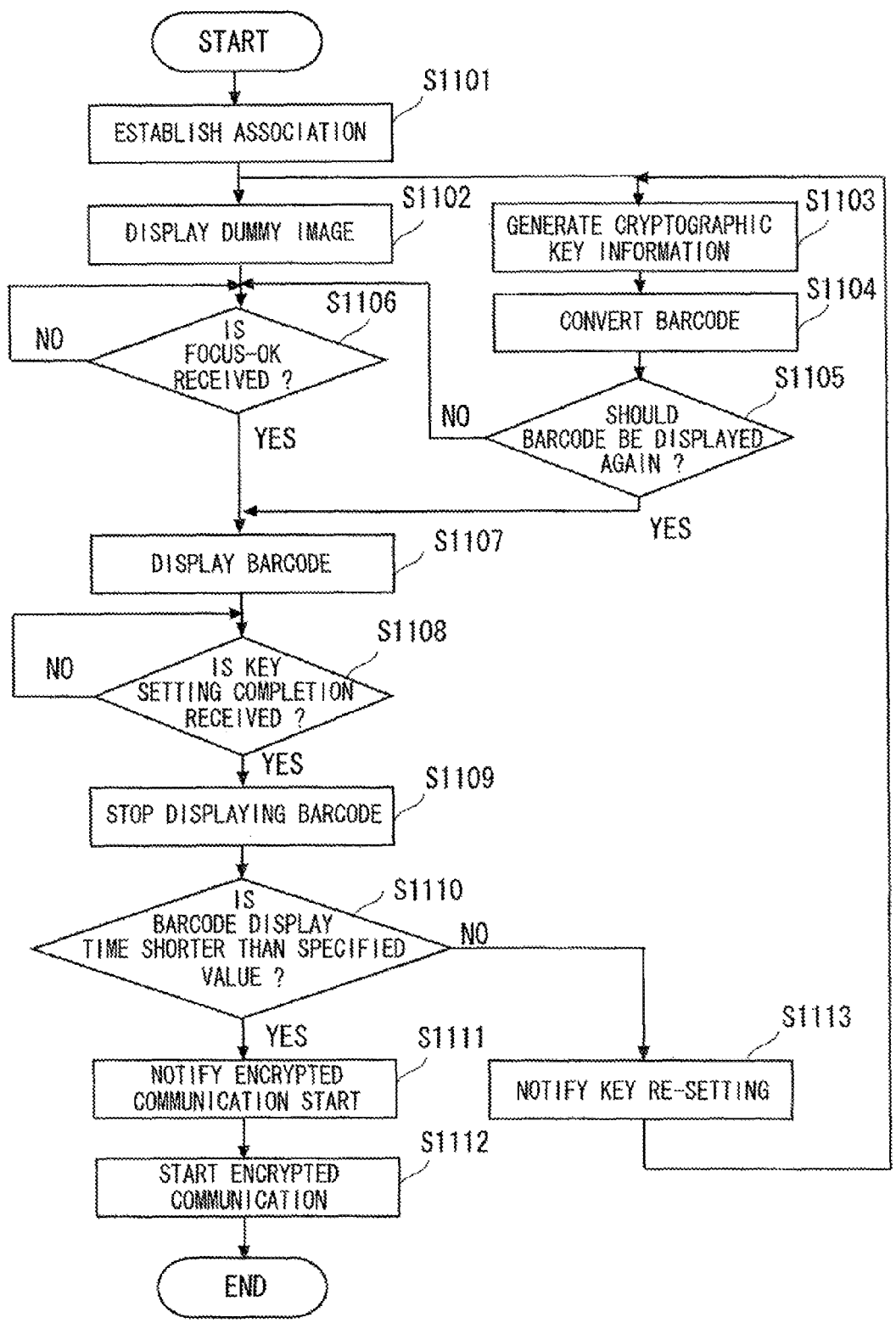
FIG. 11 is a flowchart showing an operation performed on the side of a communication apparatus that displays a 2D barcode image in a screen according to a second exemplary embodiment of the present invention.

FIG. 11 is a flowchart showing an operation performed by the communication apparatus A in the sequence shown in FIGS. 9 and 10. Further, FIG. 12 is a flowchart showing an operation performed by the communication apparatus B in the sequence shown in FIGS. 9 and 10.

An operation of the communication apparatus A is explained with reference to FIG. 11.

When users of the communication apparatuses A and B bring their apparatuses closer to each other and the communication apparatuses A and B are thereby brought in the reciprocal radio-wave receivable range, management frames are transmitted/received between both communication apparatuses to establish association. When the association is established (step S1101), the screen control unit 122 of the display unit 120 displays a dummy image for a focus adjustment generated by the dummy image generation unit 123 under an instruction from the wireless communication unit 140 (step S1102) Similarly, the cryptographic key generation/setting unit 201 generates a cryptographic key for use in wireless communication under an instruction from the wireless communication unit 140 (step S1103).

The cryptographic key generation/setting unit 201 sends information of the generated cryptographic key to the barcode generation/analysis unit 202. The barcode generation/analysis unit 202 generates a 2D barcode image from the received cryptographic key information (step S1104). The 2D barcode image generated by the barcode generation/analysis unit 202 is sent to the screen control unit 122. The screen control unit 122 determines whether the received 2D barcode image is for the first display or for re-display (step S1105). Then, when the 2D barcode image is for the first display, the screen control unit 122 waits for the completion of a focus adjustment performed in the opposing communication apparatus B (No at step S1105).

After displaying the dummy image on the display screen 121, the screen control unit 122 waits for the reception of a focus-OK packet indicating the completion of shooting condition setting performed in the communication apparatus B (step S1106).

When the screen control unit 122 is notified of the reception of a focus-OK packet from the communication apparatus B by the wireless communication unit 140, the screen control unit 122 displays the 2D barcode image, which has been already received from the barcode generation/analysis unit 202, on the display screen 121 (step S1107). The display time measurement unit 124 starts measuring the time period from the display start of the 2D barcode image. After that, the communication apparatus A waits for the reception of a cryptographic key setting completion report packet indicating the cryptographic key setting completion in the communication apparatus B (step S1108).

When the screen control unit 122 is notified of the reception of the cryptographic key setting completion report packet from the communication apparatus B by the wireless communication unit 140, the screen control unit 122 stop displaying the 2D barcode image on the display screen 121 (step S1109). At the same time, the display time measurement unit 124 stops the measurement of the time period from the display start of the 2D barcode image.

Further, when the cryptographic key generation/setting unit 201 is notified of the reception of the cryptographic key setting completion report packet from the communication apparatus B by the wireless communication unit 140, the cryptographic key generation/setting unit 201 determines whether the display time of the 2D barcode image on the display screen 121 was within a specified time period or not (step S1110). That is, the cryptographic key generation/setting unit 201 sends an inquiry to the screen control unit 122 about whether the display time of the 2D barcode image on the display screen 121 was within the specified time period or not.

The screen control unit 122 instructs the display time measurement unit 124 to report the measured time period from the display start of the 2D barcode image on the display screen 121 to the display stop. Upon receiving the report instruction from the screen control unit 122, the display time measurement unit 124 determines whether the measured display time was within the specified time period or not and reports the determination result to the screen control unit 122.

When the display time of the 2D barcode image was within the specified time period (Yes at step S1110), the cryptographic key generation/setting unit 201 determines that the sharing of the cryptographic key has succeeded and thereby sets the generated cryptographic key in the encryption/decryption unit 203. Then, the cryptographic key generation/setting unit 201 reports the completion of the cryptographic key setting to the wireless communication unit 140. Upon receiving that report from the cryptographic key generation/setting unit 201, the wireless communication unit 140 sends an encrypted-communication start packet indicating that subsequent communication is to be encrypted to the opposing communication apparatus B (step S1111). After this encrypted-communication start packet, both of the communication apparatuses A and B perform encrypted communication by using the set cryptographic key (step S1112).

On the other hand, when the display time of the 2D barcode image was longer than the specified time period (No at step S1110), the cryptographic key generation/setting unit 201 determines that the sharing of the cryptographic key has been failed and thereby sends a packet notifying that a barcode containing a new different cryptographic key is displayed again (cryptographic key re-setting notification) to the opposing communication apparatus B through the wireless communication unit 140 (step S1113). Upon receiving the cryptographic key re-setting notification, the communication apparatus B performs a process of invalidating (deleting) the cryptographic key, which was set by shooting the 2D barcode image.

Next, the process returns to the step S1103, in which the cryptographic key generation/setting unit 201 generates a new cryptographic key and sends the generated new cryptographic key to the barcode generation/analysis unit 202 (step S1103). Note that, at this point, the cryptographic key generation/setting unit 201 notifies the screen control unit 122 that a 2D barcode image is displayed again. The barcode generation/analysis unit 202 generates a new 2D barcode image based on the received cryptographic key and sends the generated new 2D barcode image to the screen control unit 122 (step S1104). At this point, the screen control unit 122 recognizes that the 2D barcode image received from the barcode generation/analysis unit 202 is for re-display, and therefore immediately displays the 2D barcode image on the display screen 121 (Yes at step S1105).

The subsequent operations are the same as those explained above, therefore explanation thereof is omitted. Note that in the process in the step S1110, the maximum permissible number of times barcodes can be re-displayed may be arbitrarily determined in advance. Then, when the number of times of the consecutive cryptographic key sharing process failures reaches the arbitrarily-determined maximum permissible number, the process may be terminated. In this case, a packet notifying that the cryptographic key sharing process has been failed is sent to the communication apparatus B, and thereby instructing the communication apparatus B to invalidate (delete) the cryptographic key set in the communication apparatus B.

Next, an operation of the communication apparatus B is explained with reference to FIG. 12.

In the communication apparatus B opposing to the communication apparatus A, which performs the above-described operations, when the association is established (step S1201), the wireless communication unit 140 instructs the camera control unit 132 of the shooting unit 130 to start up the camera module and thereby starts up the camera (step S1202). A user shoots the dummy image displayed on the display screen 121 of the communication apparatus A by using the camera 131 (step S1203). The camera control unit 132 performs shooting condition setting of the camera 131 including the focus adjustment based on this dummy image, which has been shot and received (steps S1204 and S1205).

When this shooting condition setting including the focus adjustment has been completed (Yes at step S1205), the camera control unit 132 notifies the completion of the shooting condition setting including the focus adjustment to the wireless communication unit 140. The communication apparatus B transmits a packet indicating the completion of the shooting condition setting (focus-OK) to the communication apparatus A (step S1206). Note that the camera control unit 132 can automatically set the shooting condition, which is set by using the dummy image, in normal shooting operations performed after this shooting condition setting.

When the image displayed on the display screen 121 of the communication apparatus A, which has received the focus-OK packet, is switched to the 2D barcode image, the user of the communication apparatus B shoots the 2D barcode image displayed on the display screen 121 of the communication apparatus A by using the camera 131 (step S1207).

This 2D barcode image, which has shot and received, is sent to the barcode generation/analysis unit 202. The cryptographic key obtained by analyzing the 2D barcode image is sent to the cryptographic key generation/setting unit 201, and that cryptographic key is set in the encryption/decryption unit 203 (step S1208).

When the cryptographic key setting has been completed, the cryptographic key generation/setting unit 201 transmits a packet indicating the completion of the cryptographic key setting (cryptographic key setting completion report) to the communication apparatus A through the wireless communication unit 140 (step S1209).

After that, the communication apparatus B performs different processes depending on the type of a packet sent from the communication apparatus A (step S1210).

When the communication apparatus A, which has received the cryptographic key setting completion report packet, determines that the display time of the 2D barcode image was within a proper range, the communication apparatus A sends an encrypted-communication start packet to the communication apparatus B (step S1211). After this encrypted-communication start packet, both of the communication apparatuses A and B perform encrypted communication by using the set cryptographic key (step S1212).

When the display time of the 2D barcode image was longer than the specified time period, the communication apparatus A sends a packet notifying that a barcode containing a new different cryptographic key is displayed again (step S1213). When the cryptographic key generation/setting unit 201 receives this barcode re-display notification packet through the wireless communication unit 140, the cryptographic key generation/setting unit 201 performs a process of invalidating (deleting) the cryptographic key set in the encryption/decryption unit 203. Further, in relation to this cryptographic key invalidating process, a message to the effect that a cryptographic key re-setting notification will be performed is displayed on the display screen 121 through the screen control unit 122 in order to notify the user of the communication apparatus B about that (step S1214). In this case, the process returns to the step S707, in which the user of the communication apparatus B shoots the new 2D barcode image displayed on the screen display unit of the communication apparatus A by using the camera 131 and the cryptographic key is thereby set again.

Further, when the display time exceeds the specified time period again and again and the communication apparatus A thereby determines that the cryptographic key sharing process has been failed, the communication apparatus A sends a packet notifying the failure of the sharing (step S1215). When the sharing failure notification packet is received, the cryptographic key generation/setting unit 201 performs a process of invalidating (deleting) the cryptographic key set in the encryption/decryption unit 203. Further, in relation to this cryptographic key invalidating (deleting) process, a message indicating the sharing process failure is displayed on the display screen 121 through the screen control unit 122 in order to notify the user about that (step S1216). Then, the process is terminated.

Assume that the cryptographic key that is shared between the communication apparatuses A and B in the above explanation is reset when the communication has been finished (delete mode). That is, the cryptographic key generation/setting unit 201 of each of the communication apparatuses A and B receives a notification of the cancellation of the wireless-LAN connection from the wireless communication unit 140 and thereby deletes the cryptographic key set in the encryption/decryption unit 203. Accordingly, the communication apparatus A (STA) can use a different cryptographic key every time the communication apparatus A (STA) connects to the communication apparatus B (AP). Therefore, even if a cryptographic key for communication contents is intercepted and leaked to a third person in one communication session, it is still possible to conceal communication contents exchanged in the subsequent communication sessions.

However, the delete mode would be troublesome for communication with apparatuses with which communication is frequently performed. Therefore, the communication apparatus according to this exemplary embodiment can also share a cryptographic key in a registration mode. Whether the mode is set to a delete mode or a registration mode can be selected by a setting on the communication apparatus A (STA). An operation for sharing a cryptographic key in a registration mode is explained hereinafter.

A user of the communication apparatus A (STA) who desires to set the cryptographic key sharing to a registration mode performs a registration mode setting in the communication apparatus A (STA). For example, a registration mode setting flag is set in a storage area used by the cryptographic key generation/setting unit 210. The communication apparatus A, in which the registration mode setting has been made, generates a 2D barcode image containing information indicating the registration mode in addition to the cryptographic key information. Further, the communication apparatus B (AP), which has shot and received the 2D barcode image of the communication apparatus A, extracts the registration mode setting information at the same time as the extraction of the cryptographic key in the analysis of the 2D barcode image.

In this manner, both of the communication apparatus A (STA) and the communication apparatus B (AP) recognize that the cryptographic key, which has been shared by transmitting the 2D barcode image, is to be handled in the registration mode. Therefore, at the end of the communication, the cryptographic key set in the encryption/decryption unit 203 is not deleted immediately, but is deleted after the cryptographic key is registered within each of the communication apparatuses. For example, the communication apparatus A (STA) associates the cryptographic key with the SSID of the opposing communication apparatus B (AP) and thereby registers the cryptographic key in the form of a registration mode cryptographic key table in a storage area used by the cryptographic key generation/setting unit 210. Further, the communication apparatus B (AP) associates the cryptographic key with the MAC address of the opposing communication apparatus A (STA) and thereby registers the cryptographic key in the form of a registration mode cryptographic key table in a storage area used by the cryptographic key generation/setting unit 210. Then, after the cryptographic key set in the encryption/decryption unit 203 is registered in the registration mode cryptographic key table, the cryptographic key is deleted.

Figure 13:
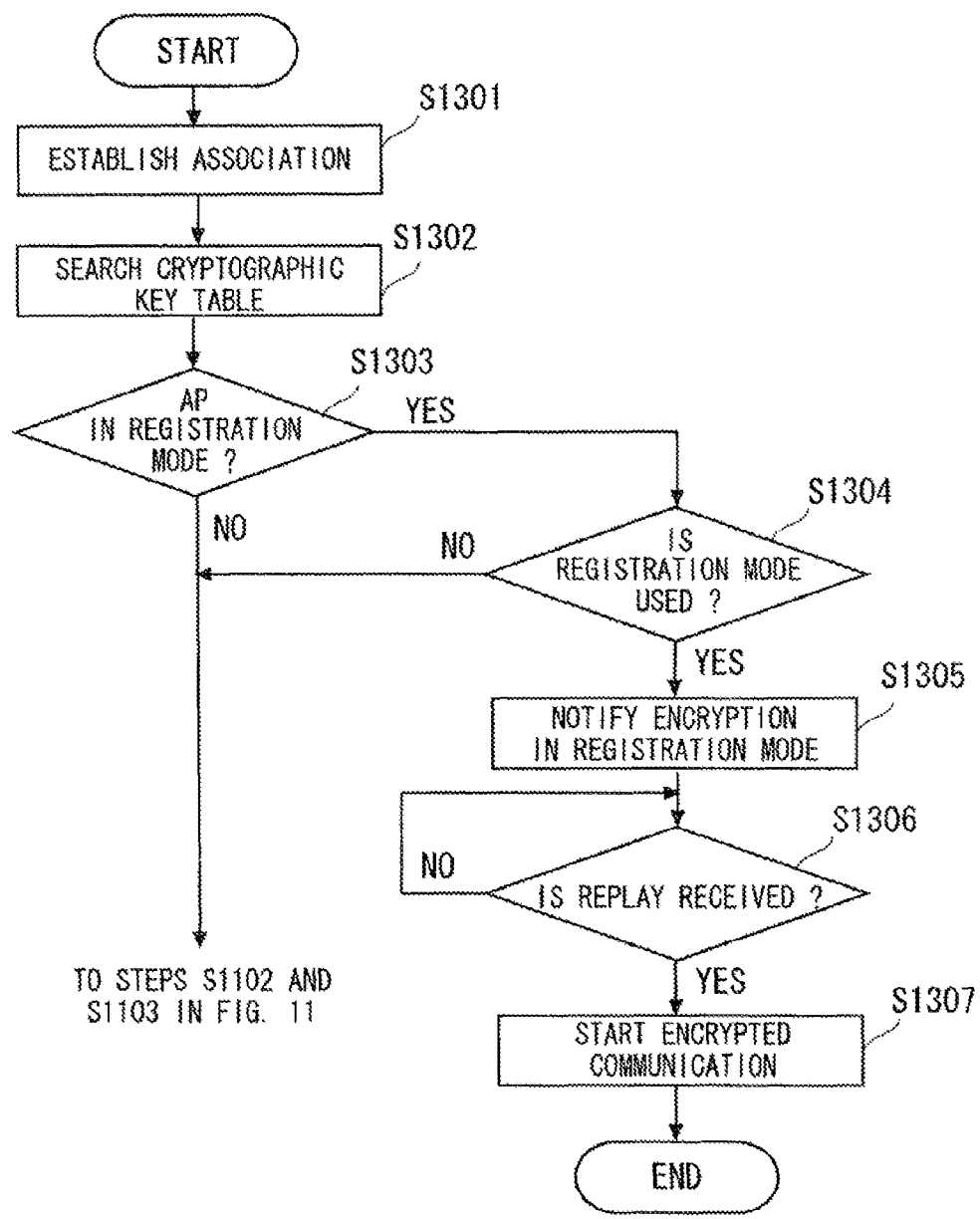
FIG. 13 is a flowchart showing an operation performed on a wireless-LAN terminal side in a registration mode of cryptographic key sharing according to a second exemplary embodiment of the present invention.
Figure 14:
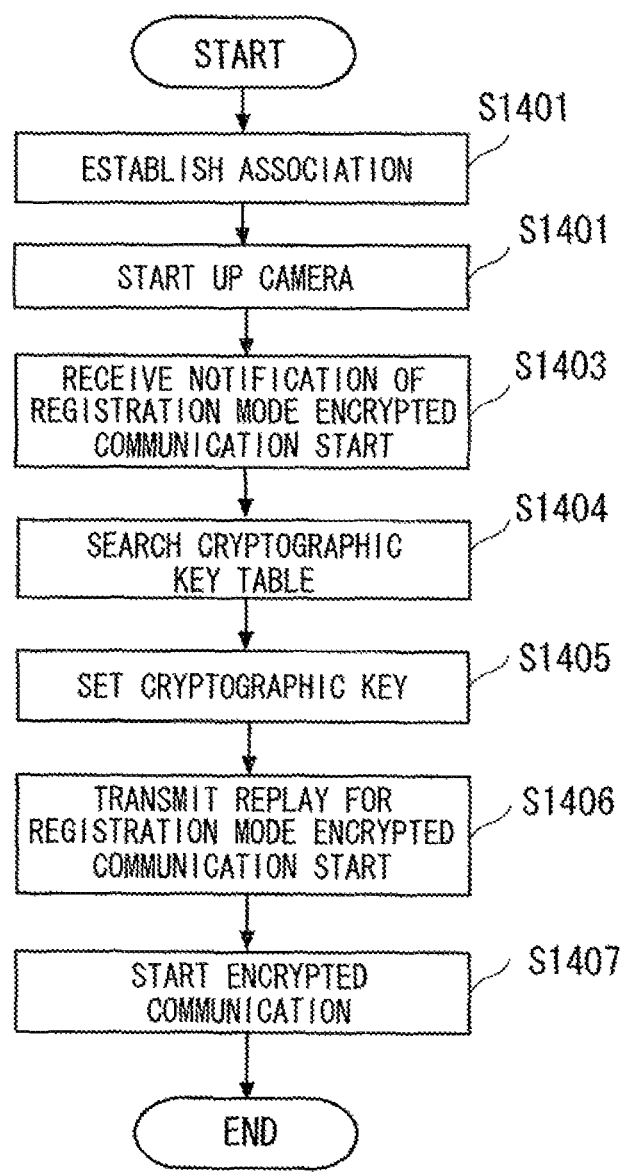
FIG. 14 is a flowchart showing an operation performed on a wireless-LAN access point side in a registration mode of cryptographic key sharing according to a second exemplary embodiment of the present invention.

Next, an operation in which a cryptographic key that is registered in advance in the registration mode cryptographic key table in the above-described manner is used is explained with reference to FIGS. 13 and 14. FIG. 13 is a flowchart showing a cryptographic key sharing operation in a registration mode performed by the communication apparatus A that serves as an STA. Further, FIG. 14 is a flowchart showing a cryptographic key sharing operation in a registration mode performed by the communication apparatus B that serves as an AP.

In FIG. 13, when users of the communication apparatuses A and B bring their apparatuses closer to each other and the communication apparatuses A and B are thereby brought in the reciprocal radio-wave receivable range, management frames are transmitted/received between both communication apparatuses to establish association. When association is established (step S1301), the cryptographic key generation/setting unit 201, which has received a notification indicating the association establishment from the wireless communication unit 140, recognizes that a registration mode flag is set. Then, the cryptographic key generation/setting unit 201 searches a registration mode cryptographic key table registered in a storage area by using the SSID of the AP with which communication is to be performed as a search key (step S1302), and thereby checks the presence/absence of the registration of the cryptographic key corresponding to the SSID used as the search key (step S1303).

In this process, when no cryptographic key corresponding to the SSID used as the search key has been registered (No at step S1303), the processes in the steps S1102 and S1103 in FIG. 11 are performed and a cryptographic key is thereby transmitted by using a 2D barcode image as explained above. Note that since the registration mode flag is set, a 2D barcode image containing information indicating the registration mode is generated in this case.

On the other hand, when a cryptographic key corresponding to the SSID used as the search key has been registered (Yes at step S1303), a message inquiring of the user whether he/she uses the cryptographic key in the registration mode or not is displayed on the display unit 120 (step S1304). This is because, when the cryptographic key in the registration mode is used indefinitely without being changed, there is a concern that the cryptographic key could have been intercepted and deciphered. Therefore, this process allows the user to change the cryptographic key when he/she desires. Accordingly, when the user determines that he/she does not use the cryptographic key in the registration mode (No at step S1304), the processes in the steps S1102 and S1103 in FIG. 11 are performed and a cryptographic key is thereby transmitted by using a 2D barcode image as explained above. Further, since a 2D barcode image containing information indicating the registration mode is generated in this case, the communication apparatus B, which serves as the AP, sets (thereby updates with) the newly-transmitted cryptographic key in the registration mode cryptographic key table at the end of the communication. Needless to say, the communication apparatus A, which serves as the STA, also updates the registration mode cryptographic key table with the new cryptographic key at the end of the communication.

In the determination in the step S1304, when the user determines that he/she uses the cryptographic key in the registration mode (Yes at step S1304), the cryptographic key generation/setting unit 201 reads out the cryptographic key corresponding to the SSID used as the search key from the registration mode cryptographic key table and sets the read cryptographic key in the encryption/decryption unit 203. Further, at the same time, the communication apparatus A transmits a registration mode encrypted-communication start notification packet indicating that encrypted communication in the registration mode is to be performed to the opposing communication apparatus B through the wireless communication unit 140 (step S1305).

The communication apparatus A waits for a replay to the registration mode encrypted-communication start notification packet from the communication apparatus B (step S1306). Then, when the communication apparatus A receives the replay packet for the registration mode encrypted-communication start from the communication apparatus B (Yes at step S1306), the communication apparatus A sets the cryptographic key in the registration mode in the encryption/decryption unit 203 and starts encrypted communication with the communication apparatus B (step S1307).

An operation of the communication apparatus B is explained with reference to FIG. 14.

When users of the communication apparatuses A and B bring their apparatuses closer to each other and the communication apparatuses A and B are thereby brought in the reciprocal radio-wave receivable range, management frames are transmitted/received between both communication apparatuses to establish association. When association is established (step S1401), the wireless communication unit 140 of the communication apparatus B instructs the camera control unit 132 to start up the camera module and thereby starts up the camera 131 (step S1402). Note that if it is not for the cryptographic key sharing in the registration mode, a dummy image would be displayed on the display unit 120 of the communication apparatus A. However, since it is for the cryptographic key sharing in the registration mode, no dummy image is displayed on the display unit 120 of the communication apparatus A. Instead, the communication apparatus 13 receives a registration mode encrypted-communication start notification packet, which is transmitted by the communication apparatus A in the step S1305 (step S1403).

When the cryptographic key generation/setting unit 201 is notified that the registration mode encrypted-communication start notification packet is received by the wireless communication unit 140, the cryptographic key generation/setting unit 201 searches a registration mode cryptographic key table registered in a storage area by using the MAC address of the STA with which communication is to be performed as a search key and thereby reads out a cryptographic key corresponding to the MAC address (step S1404). Then, the read cryptographic key is set in the encryption/decryption unit 203 (step S1405). At this point, the cryptographic key generation/setting unit 201 displays a message to the effect that encrypted communication using the cryptographic key in the registration mode is to be performed on the display unit 120 in order to notify the user about that. Further, when the registration mode encrypted-communication start notification packet is received, the wireless communication unit 140 instructs the camera control unit 132 to stop the camera module.

When the cryptographic key setting and relevant processes have been completed in the communication apparatus B, the communication apparatus B transmits a replay packet for the registration mode encrypted-communication start to the communication apparatus A through the wireless communication unit 140 (step S1406). After that, the communication apparatus B starts encrypted communication with the communication apparatus A (step S1407).

As has been explained above, in the second exemplary embodiment according to the present invention, the communication apparatuses A and B, which communicate with each other, have identical and symmetrical configurations. Further, a user performs an operation for sharing a cryptographic key by shooting a 2D barcode image containing cryptographic key information displayed in one of the communication apparatuses by using the other communication apparatus. In order to ensure the safety even when this sharing operation is performed in a public place in which a lot of third persons are present around the user, the communication apparatus A displays the 2D barcode image containing the cryptographic key information only for a short time. That is, when the focus of the camera of the communication apparatus B is being adjusted, the communication apparatus A displays a dummy image that does not need to be protected from a third person. Then, when the 2D barcode image containing the cryptographic key information is displayed, the communication apparatus A checks the time that was required for the sharing operation even when the sharing operation has succeeded. If there is a possibility that the safety of the transmitted cryptographic key cannot be sufficiently ensured, the communication apparatus A generates and transmits a new cryptographic key again. Therefore, the communication apparatus according to the second exemplary embodiment can perform the sharing of a cryptographic key, which is setting information used to encrypt communication contents, with a simple user operation and with safety even when the sharing operation is performed in public places.

Further, in the communication apparatus according to the second exemplary embodiment, there are two different modes, i.e., a delete mode in which every time a shared cryptographic key is used, the cryptographic key is deleted and a new cryptographic key is used, and a registration mode in which once a cryptographic key is shared, the cryptographic key is used in the subsequent communication. Therefore, a user of the communication apparatus according to the second exemplary embodiment can use either a function in which the priority is placed on the safety or a function in which the priority is placed on the operability according to the use environment of the user.

Note that the above explanation is made on the assumption that the communication apparatus A according to the second exemplary embodiment performs control so as to stop displaying the 2D barcode image upon confirming the cryptographic key setting completion notification sent from the communication apparatus B in order to shorten the display time of the 2D barcode image. However, the communication apparatus A may be configured in such a manner that the communication apparatus A stops displaying the 2D barcode image when a predefined display time has elapsed without receiving the cryptographic key setting completion notification from the communication apparatus B. That is, when the communication apparatus B obtains and sets the cryptographic key by shooting the secret image, the communication apparatus B does not necessarily have to transmit the cryptographic key setting completion notification in the step 905 in FIG. 9.

In this case, the communication apparatus A may stop displaying the 2D barcode image when the predefined display time of the 2D barcode image has elapsed in the step 903 in FIG. 9 and send the encrypted-communication start packet in the step 906 without being notified of the key setting completion in the step S905.

Figure 12:
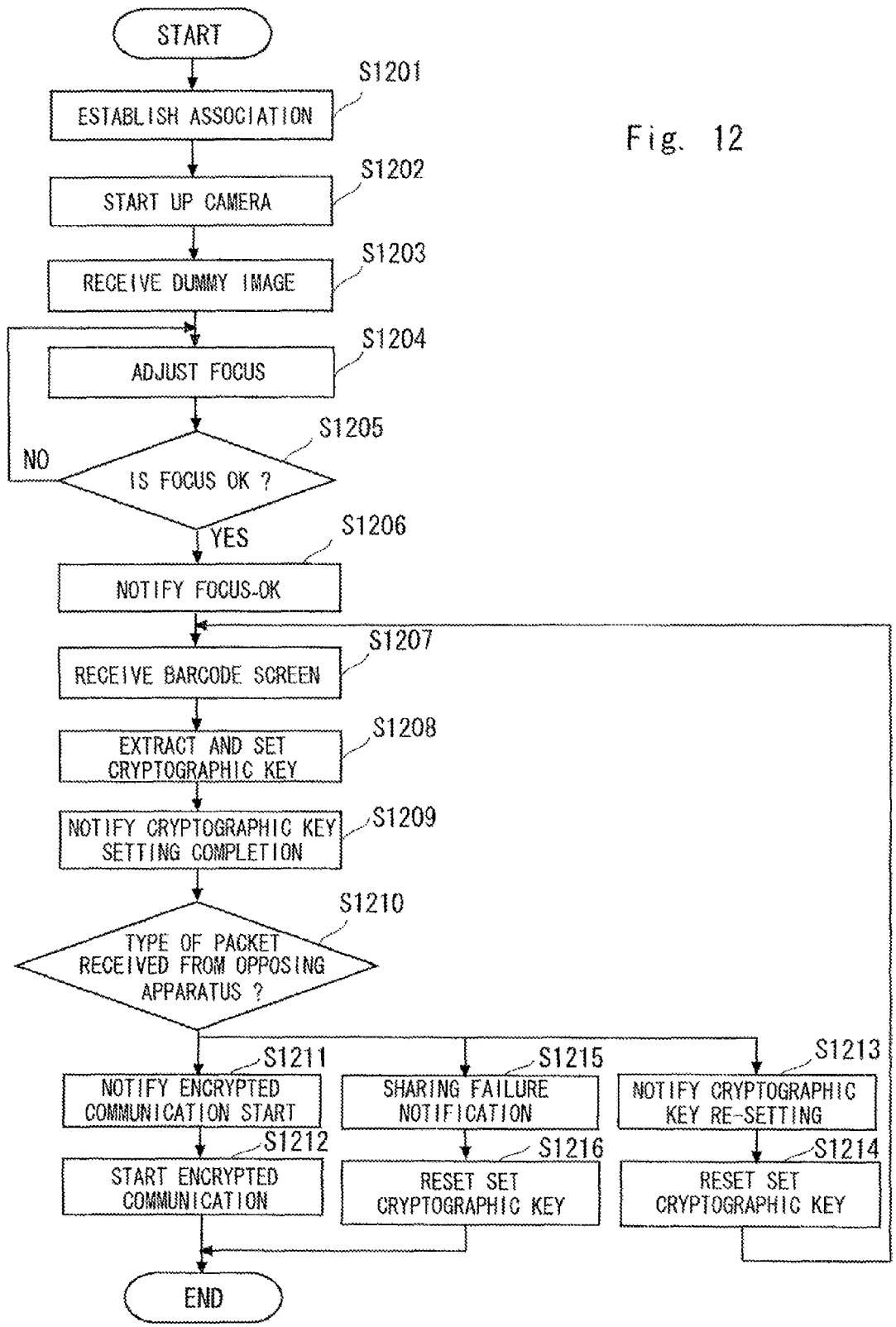
FIG. 12 is a flowchart showing an operation performed on the side of a communication apparatus that reads a 2D barcode image displayed in a communication apparatus at the other end and sets a cryptographic key according to a second exemplary embodiment of the present invention.

The explanation is made in a more specific manner with reference to FIGS. 11 and 12. When the communication apparatus B obtains and sets the cryptographic key by shooting the 2D barcode image, the communication apparatus B does not necessarily have to transmit the cryptographic key setting completion notification in the step 1205 in FIG. 12. In this case, the communication apparatus A may measure the duration of the display time of the 2D barcode image instead of waiting for the cryptographic key setting completion notification in the step S1108 in FIG. 11. Then, when the predefined time has elapsed, the communication apparatus A may perform control so as to stop displaying the 2D barcode image (step S1109). Then, the communication apparatus A may send the encrypted-communication start packet in the step S1111 in FIG. 11 without performing the process in the step S1110.

More specifically, when the wireless communication unit 140 of the communication apparatus A receives the focus-OK packet indicating the completion of the shooting setting from the communication apparatus B, the wireless communication unit 140 sends an instruction for switching the display on the display screen 121 to the screen control unit 122. Upon receiving the display switching instruction, the screen control unit 122 switches the image displayed on the display screen 121 from the dummy image to the 2D barcode image sent from the barcode generation/analysis unit 202. At this point, the screen control unit 122 instructs the display time measurement unit 124 to carry out the measurement of a predefined display time. When the display time measurement unit 124 has completed this measurement of the predefined display time, the display time measurement unit 124 sends a notification to that effect to the screen control unit 122. Upon receiving the notification of the expiration of the display time from the display time measurement unit 124, the screen control unit 122 stops displaying the 2D barcode image displayed on the display screen 121 and notifies the finish of the display to the cryptographic key generation/setting unit 201. Upon receiving the display finish of the 2D barcode image from the screen control unit 122, the cryptographic key generation/setting unit 201 sets the cryptographic key in the encryption/decryption unit 203 and transmits an encrypted-communication start packet to the communication apparatus B through the wireless communication unit 140.

If the communication apparatus B has not set the cryptographic key yet at this point, the communication apparatus B transmits a re-display request packet for a 2D barcode image to the communication apparatus A. Then, when the communication apparatus A receives the re-display request packet for a 2D barcode image from the communication apparatus B, the communication apparatus A displays a 2D barcode image again. With configuration like this, the communication apparatus according to the second exemplary embodiment can simplify the 2D-barcode-image display control including the display time measurement unit 124. Needless to say, even in this case, the communication apparatus can operate in either a delete mode or a registration mode.

Next, a third exemplary embodiment according to the present invention is explained.

As a communication apparatus according to a third exemplary embodiment, a communication apparatus having a configuration that is more closer to the actual usage form than that of the communication apparatus A or the communication apparatus B according to the second exemplary embodiment is explained as an example.

For example, a communication apparatus A is a communication apparatus equipped with an Internet communication function and a function of operating as an STA of a wireless-LAN, and is a terminal device capable of accessing the Internet through an AP of the wireless-LAN. Further, a communication apparatus B is a mobile phone terminal, and is equipped with, for example, a 3G (third-generation) mobile phone communication function and a function of operating as an AP of a wireless-LAN.

By using the terminal device and the mobile phone terminal like these, a user of the terminal device can access the Internet at a given place in cooperation with a user of the mobile phone terminal. When the terminal device has a game function, the user can download game software through the Internet and/or play a game against another person through the Internet in the usage form like this. Further, by introducing a setting for permitting the broadcast of ARP (Address Resolution Protocol) request packets from an STA and/or a packet relay between STAs within the same area in the wireless-LAN AP function of the mobile phone terminal, a plurality of users can play against one another with a plurality of terminal devices by using this mobile phone terminal as the central communication device.

Figure 15:
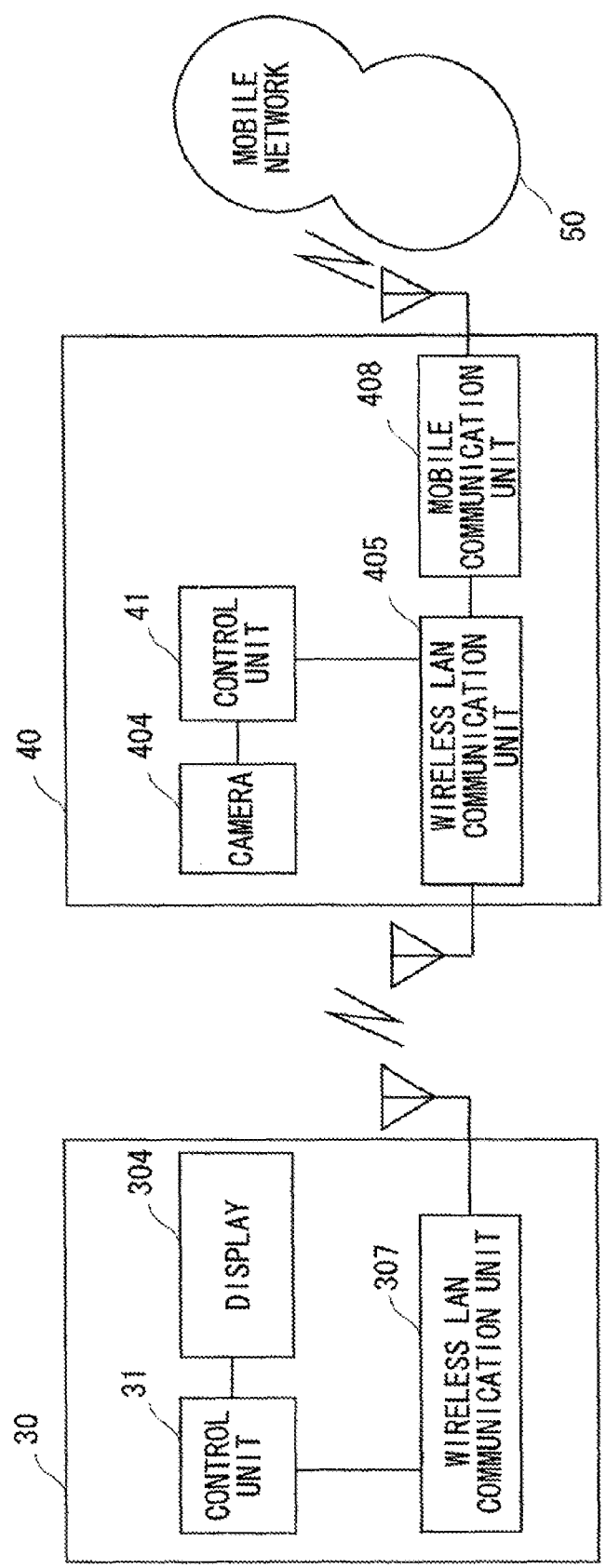
FIG. 15 is a system configuration diagram according to a third exemplary embodiment of the present invention.

The third exemplary embodiment like this is explained with reference to the drawings. FIG. 15 is a system configuration diagram of a third exemplary embodiment according to the present invention. A game machine 30 is a communication apparatus corresponding to the communication apparatus A of the second exemplary embodiment, and a mobile phone terminal 40 is a communication apparatus corresponding to the communication apparatus B. The game machine 30 includes a display 304 as the display unit, a wireless-LAN communication unit 307, and a control unit 31. The mobile phone terminal 40 includes a camera 404 as the shooting unit, a wireless-LAN communication unit 405, a mobile communication unit 408, and a control unit 41. The game machine 30 and the mobile phone terminal 40 perform wireless-LAN communication through their own wireless-LAN communication units 307 and 405. Further, the mobile phone terminal 40 communicates with a mobile network 140 through the mobile communication unit 408. Not that the mobile network is assumed to be a 3G mobile phone communication network. Further, the game machine 30 works as a wireless-LAN terminal (STA), and thereby can connect to the mobile network and the Internet through the mobile phone terminal 40 having a wireless-LAN access-point (AP) function.

Figure 16A:
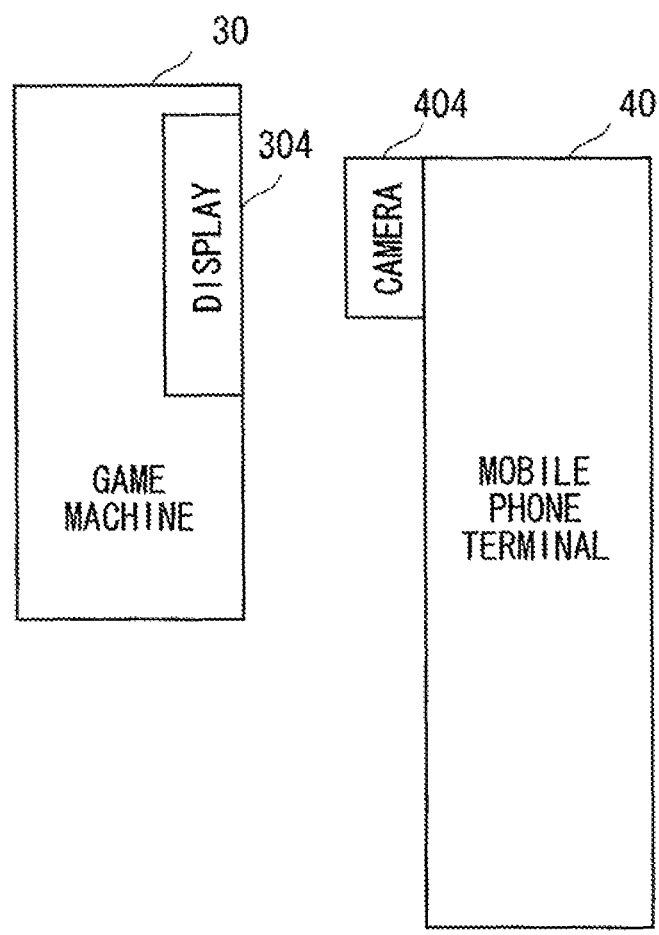
FIG. 16A is a schematic figure showing a use example of a game machine and a mobile phone terminal according to a third exemplary embodiment of the present invention, and is a side view of the game machine and the mobile phone terminal performing the transmission of a cryptographic key.
Figure 16B:
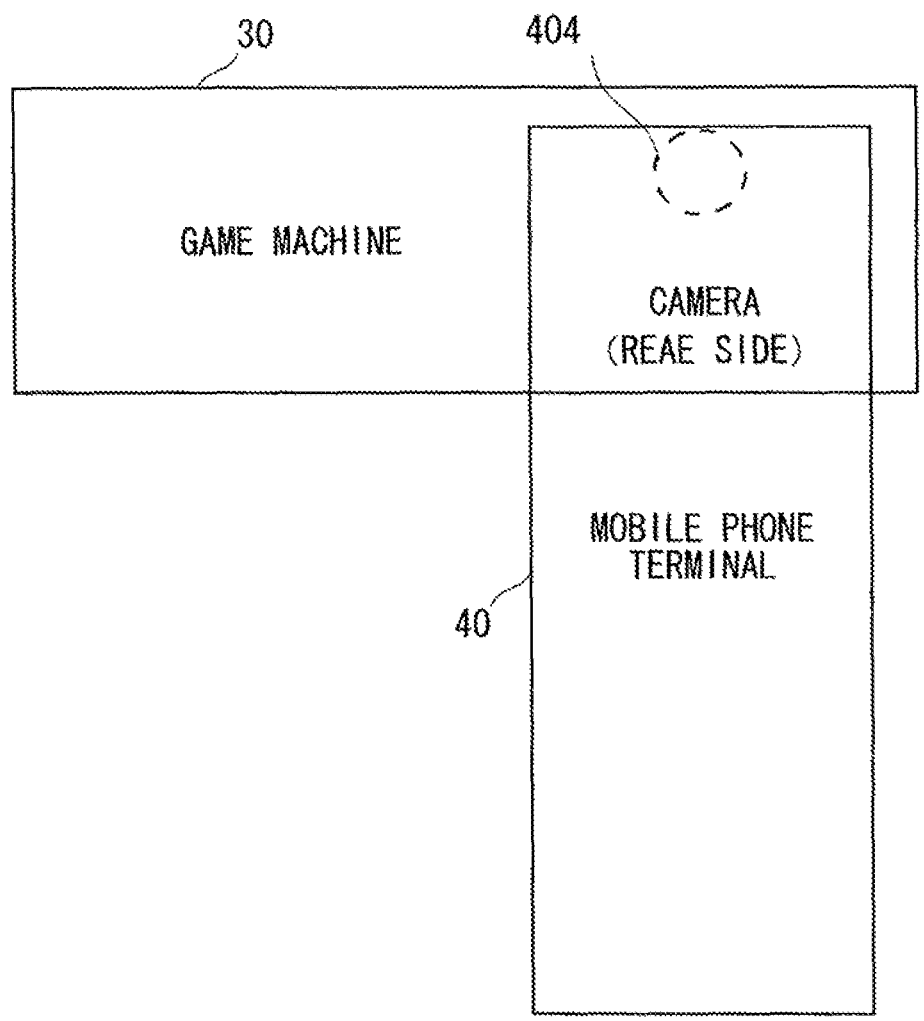
FIG. 16B is a schematic figure showing a use example of a game machine and a mobile phone terminal according to a third exemplary embodiment of the present invention, and is a rear view of a camera of the mobile phone terminal.

In the system configuration like this, FIG. 16 shows schematic figures showing use examples of the game machine 30 and the mobile phone terminal 40 according to the third exemplary embodiment of the present invention. The game machine 30 generates a cryptographic key for use in wireless-LAN communication with the mobile phone terminal 40 and displays a dummy image and a 2D barcode image on the display 304 in the same manner as that explained in the second exemplary embodiment. The user shoots and receives the image displayed on the display 304 of the game machine 30 by holding the camera 404 attached to the mobile phone terminal 40 over the front of the display 304 of the game machine 30. FIG. 16A is a side view of the game machine 30 and the mobile phone terminal 40 performing the transmission of a cryptographic key in this manner, and FIG. 16B is a rear view of the camera of the mobile phone terminal 40.

Figure 17:
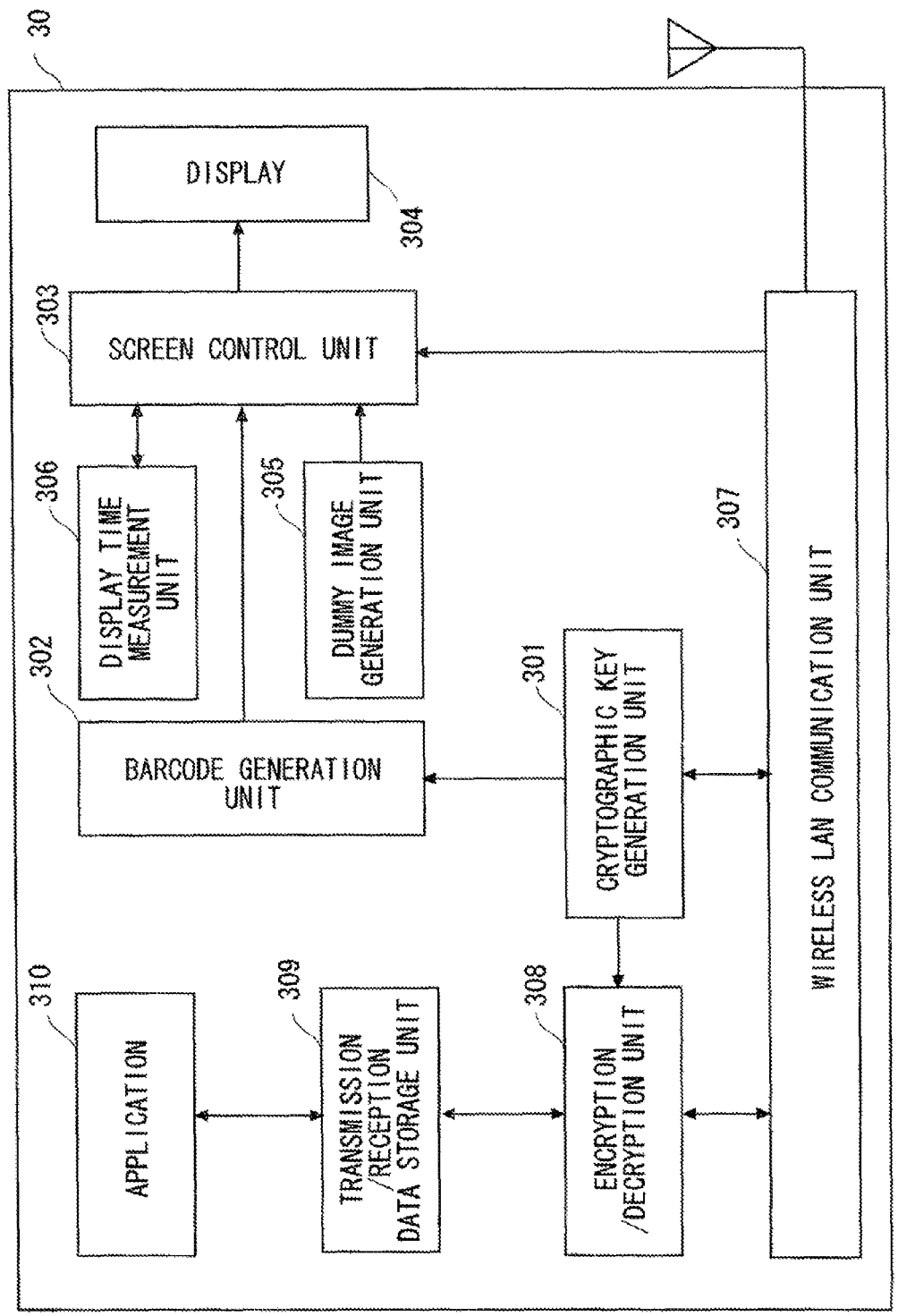
FIG. 17 is a block diagram showing a configuration of a game machine according to a third exemplary embodiment of the present invention.

FIG. 17 is a block diagram showing a functional configuration of the game machine 30 according to the third exemplary embodiment of the present invention.

As shown in FIG. 17, the game machine 30 includes a cryptographic key generation unit 301, a barcode generation unit 302, a screen control unit 303, a display 304, a dummy image generation unit 305, and a display time measurement unit 306. The game machine 30 also includes a wireless-LAN communication unit 307, an encryption/decryption unit 308, a transmission/reception data storage unit 309, and an application 310. Note that only the functions relevant to this exemplary embodiment are mentioned in this functional configuration and other configurations necessary as a game machine having a communication function are omitted.

The game machine 30 operates as a wireless-LAN terminal (STA), and operates according to a similar sequence to that of the communication apparatus A in the second exemplary embodiment explained above with reference to FIG. 11.

When the cryptographic key generation unit 301 receives a notification indicating that association of wireless-LAN communication with the mobile phone terminal 40 has been established from the wireless-LAN communication unit 307, the cryptographic key generation unit 301 generates cryptographic key information and sends the generated cryptographic key information to the barcode generation unit 302. The cryptographic key information, which is converted into a 2D barcode image by the barcode generation unit 302, is supplied to the screen control unit 303. A dummy image for a focus adjustment generated by the dummy image generation unit 305 is also supplied to the screen control unit 303. When the screen control unit 303 receives a notification indicating that association of wireless-LAN communication with the mobile phone terminal 40 has been established from the wireless-LAN communication unit 307, the screen control unit 303, firstly, displays this dummy image. The display 304 is composed of a liquid-crystal display device, an organic EL display device, or the like.

When the screen control unit 303 receives a notification indicating "focus-OK" from the mobile phone terminal 40 through the wireless-LAN communication unit 307, the screen control unit 303 displays the 2D barcode image containing the cryptographic key information on the display 304. The display time measurement unit 306 measures a time period starting from when this 2D barcode image is displayed on the display 304.

When the cryptographic key generation unit 301 receives a cryptographic key setting completion notification from the mobile phone terminal 40 through the wireless-LAN communication unit 307, the cryptographic key generation unit 301 instructs the screen control unit 303 to stop displaying the 2D barcode image on the display. Further, at this point, the cryptographic key generation unit 301 requests the screen control unit 303 to report whether the display time of the 2D barcode image was within a specified time period or not. Then, the screen control unit 303 obtains the information about whether the display time of the 2D barcode image was within the specified time period or not from the display time measurement unit 306, and reports the obtained information to the cryptographic key generation unit 301.

When the time during which the 2D barcode image is displayed on the display 304 is within the specified time period, the cryptographic key generation unit 301 sets the cryptographic key in the encryption/decryption unit 308 and notifies the mobile phone terminal 40 that encrypted communication is to be started through the wireless-LAN communication unit 307. Then, the subsequent communication performed by the application 310 is encrypted.

Further, when the display time of the 2D barcode image is longer than the specified time period, the cryptographic key generation unit 301 notifies the mobile phone terminal 40 that a cryptographic key is set again through the wireless-LAN communication unit 307. Then, the cryptographic key generation unit 301 repeats the operation of generating a new cryptographic key and transmitting the new cryptographic key by a 2D barcode image again. Then, if the display time of the 2D barcode image on the display 304 exceeds the specified time period again and again even when this operation is consecutively repeated for a predefined number of times, the transmission operation of the cryptographic key is terminated.

Next, the mobile phone terminal 40 according to the third exemplary embodiment is explained.

Figure 18:
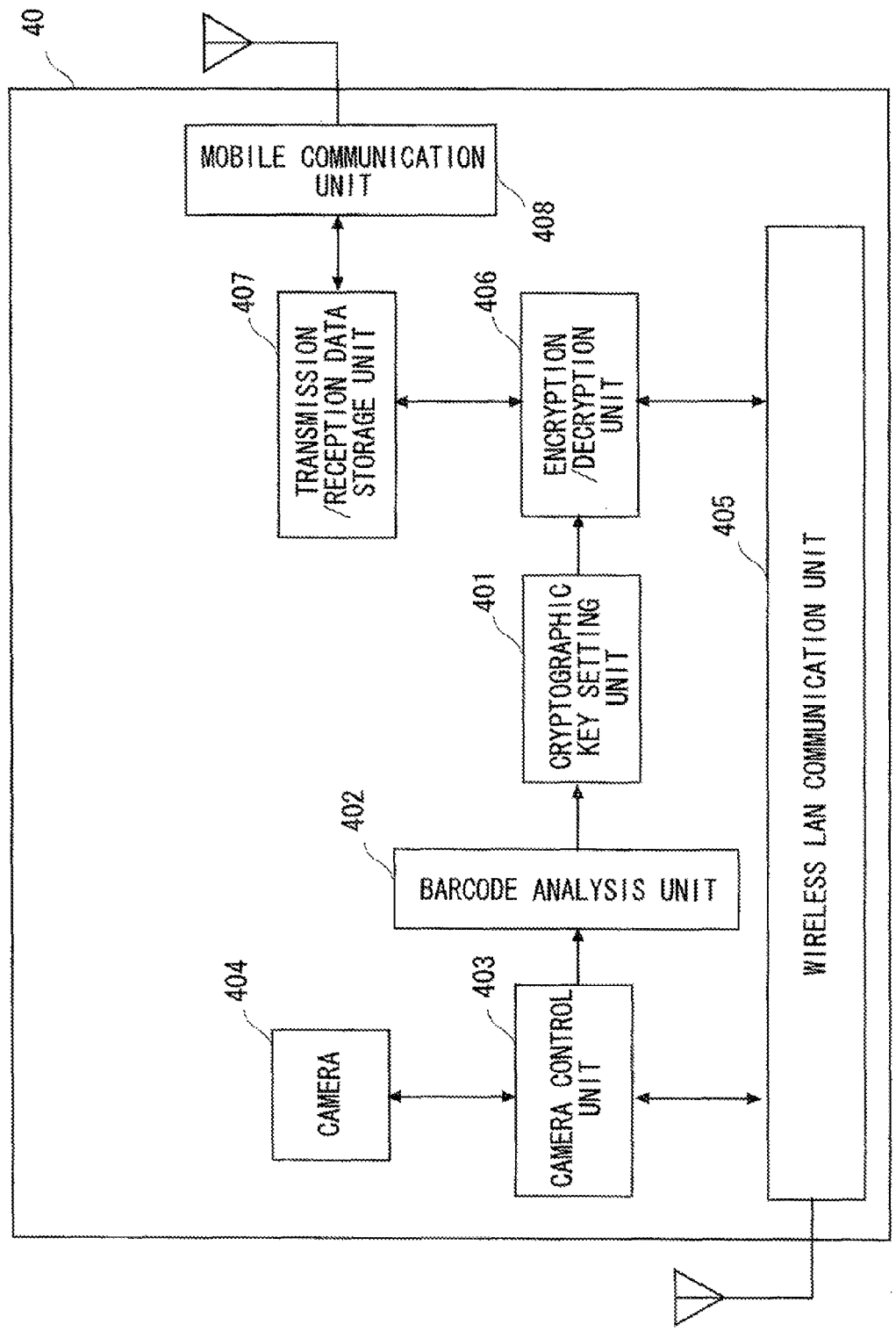
FIG. 18 is a block diagram showing a configuration of a mobile phone terminal according to a third exemplary embodiment of the present invention.

FIG. 18 is a block diagram showing a functional configuration of the mobile phone terminal 40 according to the third exemplary embodiment of the present invention.

As shown in FIG. 18, the mobile phone terminal 40 includes a cryptographic key setting unit 401, a barcode analysis unit 402, a camera control unit 403, a camera 404, a wireless-LAN communication unit 405, an encryption/decryption unit 406, a transmission/reception data storage unit 407, and a mobile communication unit 408. Note that only the functions relevant to this exemplary embodiment are mentioned in this functional configuration and other configurations necessary as a mobile phone terminal are omitted.

The mobile phone terminal 40 operates as a wireless-LAN access point (AP), and operates according to a similar sequence to that of the communication apparatus B in the second exemplary embodiment explained above with reference to FIG. 12.

When association of wireless-LAN communication with the game machine 30 has been established, the wireless-LAN communication unit 405 instructs the camera control unit 403 to start up the camera module to bring the camera 404 into a usable state. A user shoots and receives a dummy image displayed on the display 304 of the game machine 30 in a usage form shown in FIG. 16. The camera control unit 403 sets shooting condition of the camera 404 including the focus adjustment. Then, when the shooting condition has been set, the camera control unit 403 notifies "focus-OK" indicating the completion of the shooting condition setting to the game machine 30 through the wireless-LAN communication unit 405. Note that the camera control unit 403 can automatically set the shooting condition, which is set by using the dummy image, in normal shooting operations performed after this shooting condition setting.

When the notification of "focus-OK" is received and the display on the display 304 of the game machine 30 is thereby switched to the 2D barcode image, the camera control unit 403 of the mobile phone terminal 40 sends the 2D barcode image, which has shot and received by the camera 404, to the barcode analysis unit 402. The barcode analysis unit 402 analyzes this 2D barcode image and thereby extracts the cryptographic key contained in the barcode. Then, the barcode analysis unit 402 sends the extracted cryptographic key to the cryptographic key setting unit 401. The cryptographic key setting unit 401 sets that cryptographic key in the encryption/decryption unit 406.

The cryptographic key setting unit 401, which has set the cryptographic key in the encryption/decryption unit 406, notifies the game machine 30 that the cryptographic key setting has been completed through the wireless-LAN communication unit 405.

When the mobile phone terminal 40 receives an encrypted-communication start notification from the game machine 30, the mobile phone terminal 40 starts encrypted communication with the game machine 30. A request for accessing the Internet through the mobile network is transmitted from the game machine 30 to the mobile phone terminal 40, and the encryption/decryption unit 406 processes the request.

If the mobile phone terminal 40 receives a cryptographic key re-setting notification from the game machine 30, the mobile phone terminal 40 deletes the cryptographic key set in the encryption/decryption unit 406. Then, the mobile phone terminal 40 receives a new cryptographic key by shooting and receiving a new 2D barcode image displayed again on the display 304 of the game machine 30. Further, the mobile phone terminal 40 sets the received cryptographic key in the encryption/decryption unit 406. When this process is repeated again and again and, consequently, the mobile phone terminal 40 receives a cryptographic key sharing failure notification from the game machine 30, the mobile phone terminal 40 deletes the cryptographic key set in the encryption/decryption unit 406 and terminates the process.

Further, in the third exemplary embodiment, it is also possible to adopt either a delete mode in which the cryptographic key shared between the game machine 30 and the mobile phone terminal 130 is deleted at the end of the communication or a registration mode in which a cryptographic key for a communication apparatus with which communication is frequently performed is registered. The registration mode operation according to the third exemplary embodiment can be implemented by making the game machine 30 and the mobile phone terminal 40 perform the operations of the communication apparatus A and the communication apparatus B, respectively, in the second exemplary embodiment explained above with reference to FIGS. 13 and 14.

As has been explained above, in the third exemplary embodiment according to the present invention, the game machine operates as a wireless-LAN terminal (STA) and the mobile phone terminal operates as a wireless-LAN access point (AP). A user shares a cryptographic key by shooting a 2D barcode image containing cryptographic key information displayed on the display of the game machine by using the camera of the mobile phone terminal. In order to ensure the safety even when this cryptographic key sharing operation is performed in a public place in which a lot of third persons are present around the user, the game machine controls the timing at which the 2D barcode image containing the cryptographic key information is displayed. That is, when the focus of the camera of the mobile phone terminal is being adjusted, the game machine displays a dummy image that does not need to be protected from a third person. Then, when the 2D barcode image containing the cryptographic key information is displayed, the game machine checks the time that was required for the sharing operation even when the sharing operation has succeeded. If there is a possibility that the safety of the transmitted cryptographic key cannot be sufficiently ensured, the game machine generates and transmits a new cryptographic key again. The communication apparatus according to the third exemplary embodiment can shorten the display time of the 2D barcode image containing the cryptographic key information to be transmitted to the mobile phone terminal.

Further, in the communication apparatus according to the third exemplary embodiment, there are two different modes, i.e., a delete mode in which every time a shared cryptographic key is used, the cryptographic key is deleted and a new cryptographic key is used, and a registration mode in which once a cryptographic key is shared, the cryptographic key is used in the subsequent communication. Therefore, a user of the communication apparatus according to the third exemplary embodiment can use either a function in which the priority is placed on the safety or a function in which the priority is placed on the operability according to the use environment of the user.

Further, the above explanation is made on the assumption that the game machine, which is a communication apparatus according to the third exemplary embodiment, performs control so as to stop displaying the secret information image upon confirming the cryptographic key setting completion notification sent from the mobile phone terminal in order to shorten the display time of the secret information image. However, the game machine may be configured in such a manner that the game machine stops displaying the secret information image when a predefined display time has elapsed without receiving the key setting completion notification from the mobile phone terminal. That is, when the mobile phone terminal obtains and sets the cryptographic key by shooting the secret image, the mobile phone terminal does not necessarily have to transmit the cryptographic key setting completion notification in the step 1209 in FIG. 12.

In this case, the game machine may measure the duration of the display time of the secret information image instead of waiting for the cryptographic key setting completion notification in the step S1108 in FIG. 11. Then, when the predefined time has elapsed, the game machine may perform control so as to stop displaying the secret information image (step S1109). Then, the game machine may send the encrypted-communication start packet in the step S1111 in FIG. 11 without performing the process in the step S1110.

More specifically, when the wireless-LAN communication unit 307 of the game machine receives the focus-OK packet indicating the completion of the shooting setting, the wireless-LAN communication unit 307 sends an instruction for switching the display on the display 304 to the screen control unit 303. Upon receiving the display switching instruction, the screen control unit 303 switches the image displayed on the display 304 from the dummy image to the 2D barcode image sent from the barcode generation unit 302. At this point, the screen control unit 303 instructs the display time measurement unit 306 to carry out the measurement of a predefined display time. When the display time measurement unit 306 has completed this measurement of the predefined display time, the display time measurement unit 306 sends a notification to that effect to the screen control unit 303. Upon receiving the notification of the expiration of the display time from the display time measurement unit 306, the screen control unit 303 stops displaying the 2D barcode image displayed on the display screen 121 and notifies the finish of the display to the cryptographic key generation unit 301. Upon receiving the display finish of the 2D barcode image from the screen control unit 303, the cryptographic key generation unit 301 sets the cryptographic key in the encryption/decryption unit 308 and transmits an encrypted-communication start packet to the mobile phone terminal through the wireless-LAN communication unit 307.

If the mobile phone terminal has not set the cryptographic key yet at this point, the mobile phone terminal transmits a re-display request packet for a secret information image to the game machine. Then, when the game machine receives the re-display request packet for a secret information image from the mobile phone terminal, the game machine displays a secret information image again. With configuration like this, the game machine, which is a communication apparatus according to the third exemplary embodiment, can simplify the 2D-barcode-image display control including the display time measurement unit 306. Needless to say, even in this case, the communication apparatus can operate in either a delete mode or a registration mode.

INDUSTRIAL APPLICABILITY

The present invention is applicable to wireless communication apparatuses having a short-distance wireless communication function.

Although the present invention has been explained above with reference to certain exemplary embodiments, the present invention is not limited to the above-described exemplary embodiments. Various modifications that can be understood by those skilled in the art can be made to the configurations and the details of the present invention without departing from the scope of the present invention.

For example, although the present invention is described as a hardware configuration in the above-described embodiments, the present invention is not limited to the hardware configurations. Any given process in the present invention can be also implemented by causing a CPU (Central Processing Unit) to execute a computer program. In this case, the computer program can be stored by using various types of non-transitory computer readable media, and can be supplied to computers. Examples of the non-transitory computer readable media include various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

This application is based upon and claims the benefit of priority from Japanese patent application No. 2009-117319, filed on May 14, 2009, the disclosure of which is incorporated herein in its entirety by reference.

REFERENCE SIGNS LIST

1, 2, 10 COMMUNICATION APPARATUS
11 SECRET INFORMATION IMAGE GENERATION MEANS
12 DISPLAY CONTROL MEANS
13, 23 WIRELESS COMMUNICATION MEANS
21 SHOOTING CONTROL MEANS
22 SECRET INFORMATION IMAGE ANALYSIS MEANS
30 GAME MACHINE
40 MOBILE PHONE TERMINAL
110 CPU
120 DISPLAY UNIT
130 SHOOTING UNIT
140 WIRELESS COMMUNICATION UNIT
170 STORAGE UNIT
121 DISPLAY SCREEN
122, 303 SCREEN CONTROL UNIT
123, 306 DUMMY IMAGE GENERATION UNIT
124, 306 DISPLAY TIME MEASUREMENT UNIT
131, 404 CAMERA
132, 403 CAMERA CONTROL UNIT
171 CONTROL PROGRAM
201 CRYPTOGRAPHIC KEY GENERATION/SETTING UNIT
202 BARCODE GENERATION/ANALYSIS UNIT
203, 308, 406 ENCRYPTION/DECRYPTION UNIT
204 TRANSMISSION/RECEPTION DATA STORAGE UNIT
205 APPLICATION
301 CRYPTOGRAPHIC KEY GENERATION UNIT
302 BARCODE GENERATION UNIT
304 DISPLAY
401 CRYPTOGRAPHIC KEY SETTING UNIT
402 BARCODE ANALYSIS UNIT
408 MOBILE COMMUNICATION UNIT

The invention claimed is:

1. A communication apparatus comprising:
a display control unit that displays a secret information image containing secret information; and
a secret information image generation unit that, upon receiving a notification signal indicates that a preparation for shooting is completed from another communication apparatus, instructing the display control unit to display the secret information image,
wherein upon receiving a notification signal indicating that the secret information contained in the secret information image is obtained from the another communication apparatus by wireless communication after the shooting, the secret information image generation unit instructs the display control unit to stop displaying the secret information image, wherein
the display control unit displays a predetermined dummy image, and
the notification signal is a notification signal indicating that a preparation for shooting based on the dummy image is completed.

2. The communication apparatus according to claim 1, wherein
the secret information image contains a cryptographic key image containing a cryptographic key for use in encryption of wireless communication, and
the secret information image generation unit comprises a cryptographic key generation control unit that generates the cryptographic key and thereby generating the cryptographic key image, and
upon recognizing that a time period from a display start of the cryptographic key image to a display stop is within a predefined specified display time period, the cryptographic key generation control unit starts encrypted communication using the cryptographic key with the another communication apparatus.

3. The communication apparatus according to claim 2, wherein upon recognizing that a time period from a display start of the cryptographic key image to a display stop exceeds the specified display time period, the cryptographic key generation control unit notifies a display of a new cryptographic key image based on a new cryptographic key to the another communication apparatus and instructs the display control unit to display the new cryptographic key image.

4. The communication apparatus according to claim 2, wherein
the display control unit comprises:
a dummy image generation unit that generates the dummy image;
a display control unit that receives the cryptographic key image and the dummy image, and displays either the cryptographic key image or the dummy image under an instruction from the cryptographic key generation control unit; and
a display time measurement unit that measures a time period from a display start of the cryptographic key image to a display stop, and determines whether the measured time period is within the specified display time period or not, and
the display control unit reports a result of the determination made by the display time measurement unit to the cryptographic key generation control unit.

5. The communication apparatus according to claim 2, wherein the cryptographic key generation control unit deletes the cryptographic key when encrypted communication with the another communication apparatus is finished, and generates a new cryptographic key when new encrypted communication with the another communication apparatus is to be performed.

6. The communication apparatus according to claim 5, wherein
the cryptographic key generation control unit comprises a registration mode display flag that indicates a registration mode in which the cryptographic key transmitted to the another communication apparatus is reused, and a registration mode cryptographic key table in which the cryptographic key is registered in such a manner that the cryptographic key is associated with identification information of the another communication apparatus, and
when the registration mode display flag is set,
the cryptographic key image containing the cryptographic key and information indicating the registration mode is generated; when encrypted communication with the another communication apparatus is finished, the cryptographic key is registered in the registration mode cryptographic key table in such a manner that the cryptographic key is associated with identification information of the another communication apparatus and then the cryptographic key is deleted; and when new encrypted communication with the another communication apparatus is to be performed, the cryptographic key read out from the registration mode cryptographic key table is used.

7. The communication apparatus according to claim 6, wherein when encrypted communication is to be performed with the another communication apparatus, the cryptographic key generation control unit searches the registration mode cryptographic key table by using identification information of the another communication apparatus; when a registered cryptographic key is extracted, the cryptographic key generation control unit transmits a notification signal notifying implementation of encrypted communication in the registration mode to the another communication apparatus; and upon receiving a replay signal to the notification signal from the another communication apparatus, the cryptographic key generation control unit starts encrypted communication using the extracted cryptographic key.

8. The communication apparatus according to claim 2, further comprising:
a shooting unit control unit that sets a condition for subsequent normal shooting based on a shooting result of the dummy image displayed in the another communication apparatus, and outputting a notification signal notifying completion of the setting; and
a cryptographic key setting control unit that extracts and setting the cryptographic key by analyzing the cryptographic key image, which is displayed in the another communication apparatus and obtained by the normal shooting, and outputting a notification signal notifying completion of the cryptographic key setting, wherein
when a notification signal notifying a start of encrypted communication from the another communication apparatus, encrypted communication using the set cryptographic key is started.

9. The communication apparatus according to claim 8, wherein upon receiving a notification signal indicating a delete instruction of the set cryptographic key and transmission of a new cryptographic key from the another communication apparatus, the cryptographic key setting control unit deletes the set cryptographic key, extracts a new cryptographic key from a shot cryptographic key image containing the new cryptographic key displayed in the another communication apparatus, and sets the extracted new cryptographic key.

10. The communication apparatus according to claim 1, wherein the display control unit displays the secret information image only for a predefined time period.

11. A communication apparatus comprising:
a shooting control unit that sets a condition for subsequent shooting and outputting a notification signal notifying completion of a preparation for the shooting to another communication apparatus; and
a secret information image analysis unit that extracts secret information from a secret information image obtained by shooting the secret information image containing the secret information displayed in the another communication apparatus,
wherein upon extracting the secret information from the secret information image, which is displayed in the another communication apparatus and obtained by shooting, the secret information image analysis unit transmits a notification signal indicating that the secret information is obtained to the another communication apparatus by wireless communication,
and wherein the notification signal output by the shooting control unit is a notification signal notifying that a condition for subsequent shooting is set based on a shooting result of a predetermined dummy image displayed in the another communication apparatus and that a shooting preparation is completed by completion of that setting.

12. The communication apparatus according to claim 11, wherein
the secret information image contains a cryptographic key image containing a cryptographic key for use in encryption of wireless communication, and
the secret information image analysis unit comprises a cryptographic key setting control unit that uses the cryptographic key extracted from the cryptographic key image displayed in the another communication apparatus for encrypted communication with the another communication apparatus.

13. The communication apparatus according to claim 12, wherein upon receiving a notification signal indicating a delete instruction of the cryptographic key and transmission of a new cryptographic key from the another communication apparatus, the cryptographic key setting control unit deletes the extracted cryptographic key, extracts a new cryptographic key from the cryptographic key image based on the new cryptographic key, which is displayed in the another communication apparatus and obtained by the normal shooting, and uses the extracted new cryptographic key for encrypted communication with the another communication apparatus.

14. The communication apparatus according to claim 12, wherein
the cryptographic key generation control unit comprises a registration mode cryptographic key table in which the cryptographic key obtained from the another communication apparatus is registered in such a manner that the cryptographic key is associated with identification information of the another communication apparatus, and
when the cryptographic key image contains information indicating a registration mode in which the cryptographic key is reused,
when encrypted communication with the another communication apparatus is finished, the cryptographic key is registered in the registration mode cryptographic key table in such a manner that the cryptographic key is associated with identification information of the another communication apparatus, and
when a notification signal indicating encrypted communication in a registration mode is received from the another communication apparatus when new encrypted communication with the another communication apparatus is to be performed, the cryptographic key read out from the registration mode cryptographic key table is used.

15. The communication apparatus according to claim 2, wherein the cryptographic key image is a barcode image.

16. A secret information sharing method comprising:
setting a condition for subsequent shooting and transmitting a notification signal notifying completion of a preparation for the shooting to a first communication apparatus;
upon receiving a notification signal indicating that the shooting preparation is completed from a second communication apparatus, displaying a secret information image containing secret information in the first communication apparatus;
extracting the secret information from the secret information image that is displayed in the first communication apparatus and shot by the second communication apparatus;
upon extracting secret information from the secret information image shot by the second communication apparatus, transmitting a notification signal notifying completion of the secret information acquisition to the first communication apparatus by wireless communication;
upon receiving a notification signal notifying completion of the secret information acquisition from the second communication apparatus by wireless communication, stopping displaying the secret information image in the first communication apparatus;
displaying a predetermined dummy image in the first communication apparatus; and
shooting the dummy image by the second communication apparatus, setting a condition for subsequent shooting based on a result of the shooting, and transmitting a notification signal notifying completion of the shooting preparation.

17. The secret information sharing method according to claim 16, wherein
the secret information image contains a cryptographic key image containing a cryptographic key for use in encryption of wireless communication, and
the secret information sharing method further comprises:
measuring a time period from when the cryptographic key image is displayed in the first communication apparatus to when the displaying is stopped; and
upon recognizing that the measured time period is within a predefined specified display time period, starting encrypted communication using the cryptographic key with the second communication apparatus.

18. The secret information sharing method according to claim 17, wherein
upon recognizing that the measured time period exceeds the predefined specified display time period,
a notification signal notifying a delete instruction of the cryptographic key and transmission of a new cryptographic key is transmitted to the second communication apparatus,
a new cryptographic key image based on a new cryptographic key is displayed in the first communication apparatus, and
the new cryptographic key contained in the new cryptographic key image is extracted in the second communication apparatus and used for encrypted communication with the first communication apparatus.

19. The secret information sharing method according to claim 17, wherein
when the encrypted communication is finished,
the cryptographic key of each of the first and second communication apparatuses is deleted, and
when new encrypted communication is to be performed, the first communication apparatus displays the cryptographic key image based on a new cryptographic key.

20. The secret information sharing method according to claim 19, wherein
when a registration mode display flag indicating a registration mode in which the cryptographic key transmitted to the second communication apparatus is reused is set,
the first communication apparatus displays the cryptographic key image containing information of the registration mode,
when information extracted from the cryptographic key image contains information indicating the registration mode,
the second communication apparatus registers the cryptographic key in a registration mode cryptographic key table of the second communication apparatus in such a manner that the cryptographic key is associated with identification information of the first communication apparatus when encrypted communication with the first communication apparatus is finished,
the first communication apparatus registers the cryptographic key in a registration mode cryptographic key table of the first communication apparatus in such a manner that the cryptographic key is associated with identification information of the second communication apparatus when encrypted communication with the second communication apparatus is finished,
when the first communication apparatus performs new encrypted communication with the second communication apparatus, the first communication apparatus transmits a notification signal notifying encryption in a registration mode to the second communication apparatus, and upon receiving a replay signal to the notification signal from the second communication apparatus, the first communication apparatus starts encrypted communication using the cryptographic key read out from the registration mode cryptographic key table of the first communication apparatus.

21. The secret information sharing method according to claim 20, wherein when the second communication apparatus receives the notification signal notifying encryption in a registration mode from the first communication apparatus, the second communication apparatus:

searches the registration mode cryptographic key table of the second communication apparatus by using identification information of the first communication apparatus and thereby extracts a cryptographic key, transmits a replay signal to the notification signal to the first communication apparatus, and starts encrypted communication using the cryptographic key extracted from the registration mode cryptographic key table of the second communication apparatus.

22. The secret information sharing method according to claim 16, wherein the first communication apparatus displays the secret information image only for a predefined time period.

23. A secret information sharing method in a communication apparatus wherein, upon receiving a notification signal indicating that a preparation for shooting is completed from another communication apparatus, a secret information image containing secret information is displayed, and upon receiving a notification signal indicating that the secret information contained in the secret information image is obtained from the another communication apparatus by wireless communication after the shooting, stopping displaying the secret information image, wherein a predetermined dummy image is displayed, and the notification signal is a notification signal indicating that a preparation for shooting based on the dummy image is completed.

24. The secret information sharing method according to claim 23, wherein the secret information image contains a cryptographic key image containing a cryptographic key for use in encryption of wireless communication, and the secret information sharing method further comprises:

measuring a time period from when the cryptographic key image is displayed to when the displaying is stopped; and upon recognizing that the measured time period is within a predefined specified display time period, starting encrypted communication using the cryptographic key with the another communication apparatus.

25. The secret information sharing method according to claim 24, wherein upon recognizing that the measured time period exceeds the predefined specified display time period, a notification signal notifying a delete instruction of the cryptographic key and transmission of a new cryptographic key is transmitted to the another communication apparatus, a new cryptographic key image based on a new cryptographic key is displayed, and encrypted communication with the another communication apparatus, which has extracted the new cryptographic key contained in the new cryptographic key image, is performed by using the new cryptographic key.

26. The secret information sharing method according to claim 24, wherein when the encrypted communication is finished, the cryptographic key is deleted, and when new encrypted communication with the another communication apparatus is to be performed, the cryptographic key image based on a new cryptographic key is displayed.

27. The secret information sharing method according to claim 26, wherein when a registration mode display flag indicating a registration mode in which the cryptographic key transmitted to the another communication apparatus is reused is set, a cryptographic key image containing the cryptographic key and information of the registration mode is displayed, when encrypted communication with the another communication apparatus is finished, the cryptographic key is registered in a registration mode cryptographic key table in such a manner that the cryptographic key is associated with identification information of the another communication apparatus, when new encrypted communication with the another communication apparatus is to be performed, a cryptographic key corresponding to identification information of the another communication apparatus is extracted from the registration mode cryptographic key table, a notification signal notifying encryption in the registration mode is transmitted to the another communication apparatus, and upon receiving a replay signal to the notification signal from the another communication apparatus, encrypted communication is started by using the cryptographic key extracted from the registration mode cryptographic key table.

28. The secret information sharing method according to claim 23, wherein the secret information image is displayed only for a predefined time period.

29. A secret information sharing method comprising:

setting a condition for subsequent shooting, and transmitting a notification signal notifying completion of a preparation for the shooting to another communication apparatus;

extracting secret information from a secret information image obtained by shooting the secret information image containing the secret information displayed in the another communication apparatus; and upon extracting the secret information from the secret information image displayed in the another communication apparatus, a notification signal indicating that the secret information is obtained is transmitted to the another communication apparatus by wireless communication, wherein the notification signal is a notification signal notifying that a condition for subsequent shooting is set based on a shooting result of a predetermined dummy image displayed in the another communication apparatus and that a shooting preparation is completed by completion of that setting.

30. The secret information sharing method according to claim 29, wherein
the secret information image contains a cryptographic key image containing a cryptographic key for use in encryption of wireless communication, and
the cryptographic key extracted from the cryptographic key image, which is displayed in the another communication apparatus and obtained by the normal shooting, is used for encrypted communication with the another communication apparatus.

31. The secret information sharing method according to claim 30, wherein upon receiving a notification signal indicating a delete instruction of the cryptographic key and transmission of a new cryptographic key from the another communication apparatus, the extracted cryptographic key is deleted; and a new cryptographic key is extracted from the cryptographic key image based on the new cryptographic key, which is displayed in the another communication apparatus and obtained by the normal shooting, and used for encrypted communication with the another communication apparatus.

32. The secret information sharing method according to claim 30, wherein
a registration mode cryptographic key table in which the cryptographic key obtained from the another communication apparatus is registered in such a manner that the cryptographic key is associated with identification information of the another communication apparatus is provided, and
when the cryptographic key image contains information indicating a registration mode in which the cryptographic key is reused,
when encrypted communication with the another communication apparatus is finished, the cryptographic key is registered in the registration mode cryptographic key table in such a manner that the cryptographic key is associated with identification information of the another communication apparatus, and
when a notification signal indicating encrypted communication in a registration mode is received from the another communication apparatus when new encrypted communication with the another communication apparatus is to be performed, the cryptographic key read out from the registration mode cryptographic key table is used.

33. The secret information sharing method according to claim 17, wherein the cryptographic key image is a barcode image.

34. A non-transitory computer readable storage medium storing a program that causes a computer to execute secret information sharing processing, wherein the program causes the computer to execute, upon receiving a notification signal indicating that a preparation for shooting is completed from another communication apparatus, a process of displaying a secret information image containing secret information,
upon receiving a notification signal indicating that the secret information contained in the secret information image is obtained from the another communication apparatus by wireless communication after the shooting, a process of stopping displaying the secret information image, wherein
the program causes a computer to execute a process of displaying a dummy image, and
the notification signal is a notification signal indicating that a preparation for shooting based on the dummy image is completed.

35. The non-transitory computer readable storage medium storing a program according to claim 34, wherein
the secret information image contains a cryptographic key image containing a cryptographic key for use in encryption of wireless communication, and
the program further causes the computer to execute:
a process of measuring a time period from when the cryptographic key image is displayed to when the displaying is stopped; and
upon recognizing that the measured time period is within a predefined specified display time period, a process of starting encrypted communication using the cryptographic key with the another communication apparatus.

36. The non-transitory computer readable storage medium storing a program according to claim 35, wherein the program causes the computer to execute:
upon recognizing that the measured time period exceeds the predefined specified display time period,
a process of transmitting a notification signal notifying a delete instruction of the cryptographic key and transmission of a new cryptographic key to the another communication apparatus,
a process of displaying a new cryptographic key image based on a new cryptographic key, and
a process of performing encrypted communication with the another communication apparatus, which has extracted the new cryptographic key contained in the new cryptographic key image, by using the new cryptographic key.

37. The non-transitory computer readable storage medium storing a program according to claim 35, wherein the program causes the computer to execute:
when the encrypted communication is finished, a process of deleting the cryptographic key; and
when new encrypted communication with the another communication apparatus is to be performed, a process of displaying the cryptographic key image based on a new cryptographic key.

38. The non-transitory computer readable storage medium storing a program according to claim 37, wherein the program causes the computer to execute:
when a registration mode display flag indicating a registration mode in which the cryptographic key transmitted to the another communication apparatus is reused is set,
a process of displaying a cryptographic key image containing the cryptographic key and information of the registration mode;
when encrypted communication with the another communication apparatus is finished, a process of registering the cryptographic key in a registration mode cryptographic key table in such a manner that the cryptographic key is associated with identification information of the another communication apparatus,
when new encrypted communication with the another communication apparatus is to be performed, a process of extracting a cryptographic key corresponding to identification information of the another communication apparatus from the registration mode cryptographic key table,
a process of transmitting a notification signal notifying encryption in the registration mode to the another communication apparatus, and
upon receiving a replay signal to the notification signal from the another communication apparatus, a process of starting encrypted communication by using the cryptographic key extracted from the registration mode cryptographic key table.

39. The non-transitory computer readable storage medium storing a program according to claim 34, wherein the program causes the computer to execute a process of displaying the secret information image only for a predefined time period.

40. A non-transitory computer readable storage medium storing a program that causes a computer to execute secret information sharing processing, wherein the program causes the computer to execute:
 a process of setting a condition for subsequent shooting, and transmitting a notification signal notifying completion of a preparation for the shooting to another communication apparatus;
 a process of extracting secret information from a secret information image obtained by shooting the secret information image containing the secret information displayed in the another communication apparatus; and
 upon extracting the secret information from the secret information image displayed in the another communication apparatus, a process of transmitting a notification signal indicating that the secret information is obtained to the another communication apparatus by wireless communication,
 wherein the notification signal is a notification signal notifying that a condition for subsequent shooting is set based on a shooting result of a predetermined dummy image displayed in the another communication apparatus and that a shooting preparation is completed by completion of that setting.

41. The non-transitory computer readable storage medium storing a program according to claim 40, wherein
 the secret information image contains a cryptographic key image containing a cryptographic key for use in encryption of wireless communication, and
 the program causes the computer to execute a process of using the cryptographic key extracted from the cryptographic key image, which is displayed in the another communication apparatus and obtained by the normal shooting, for encrypted communication with the another communication apparatus.

42. The non-transitory computer readable storage medium storing a program according to claim 41, wherein the program causes the computer to execute, upon receiving a notification signal indicating a delete instruction of the cryptographic key and transmission of a new cryptographic key from the another communication apparatus, a process of deleting the extracted cryptographic key, extracting a new cryptographic key from the cryptographic key image based on the new cryptographic key, which is displayed in the another communication apparatus and obtained by the normal shooting, and using the extracted new cryptographic key for encrypted communication with the another communication apparatus.

43. The non-transitory computer readable storage medium storing a program according to claim 41, wherein
 a registration mode cryptographic key table in which the cryptographic key obtained from the another communication apparatus is registered in such a manner that the cryptographic key is associated with identification information of the another communication apparatus is provided, and when the cryptographic key image contains information indicating a registration mode in which the cryptographic key is reused, the program causes the computer to execute:
 when encrypted communication with the another communication apparatus is finished, a process of registering the cryptographic key in the registration mode cryptographic key table in such a manner that the cryptographic key is associated with identification information of the another communication apparatus; and
 when a notification signal indicating encrypted communication in a registration mode is received from the another communication apparatus when new encrypted communication with the another communication apparatus is to be performed, a process of using the cryptographic key read out from the registration mode cryptographic key table for the new encrypted communication.

44. The non-transitory computer readable storage medium storing a program according to claim 35, wherein the cryptographic key image is a barcode image.

45. A communication apparatus comprising:
 display control means for displaying a secret information image containing secret information; and
 secret information image generation means for, upon receiving a notification signal indicating that a preparation for shooting is completed from another communication apparatus, instructing the display control means to display the secret information image,
 wherein upon receiving a notification signal indicating that the secret information contained in the secret information image is obtained from the another communication apparatus by wireless communication after the shooting, the secret information image generation means instructs the display control unit to stop displaying the secret information image, wherein
 the display control means displays a predetermined dummy image, and
 the notification signal is a notification signal indicating that a preparation for shooting based on the dummy image is completed.

46. A communication apparatus comprising:
 shooting control means for setting a condition for subsequent shooting and outputting a notification signal notifying completion of a preparation for the shooting to another communication apparatus; and
 secret information image analysis means for extracting secret information from a secret information image obtained by shooting the secret information image containing the secret information displayed in the another communication apparatus,
 wherein upon extracting the secret information from the secret information image, which is displayed in the another communication apparatus and obtained by shooting, the secret information image analysis means transmits a notification signal indicating that the secret information is obtained to the another communication apparatus by wireless communication,
 and wherein the notification signal output by the shooting control unit is a notification signal notifying that a condition for subsequent shooting is set based on a shooting result of a predetermined dummy image displayed in the another communication apparatus and that a shooting preparation is completed by completion of that setting.

* * * * *